US012754660B2

(12) United States Patent
Zhou et al.

(10) Patent No.: US 12,754,660 B2
(45) Date of Patent: Oct. 6, 2026

(54) WORKFLOW CONTROL METHOD, APPARATUS AND SYSTEM, AND MEDIUM AND PROGRAM PRODUCT

(71) Applicant: Siemens Aktiengesellschaft, Munich (DE)

(72) Inventors: Zhen Hua Zhou, Shanghai (CN); Xiaoxun Zhu, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 242 days.

(21) Appl. No.: 18/834,082

(22) PCT Filed: Jan. 29, 2022

(86) PCT No.: PCT/CN2022/075083
§ 371 (c)(1),
(2) Date: Jul. 29, 2024

(87) PCT Pub. No.: WO2023/142076
PCT Pub. Date: Aug. 3, 2023

(65) Prior Publication Data
US 2025/0103189 A1 Mar. 27, 2025

(51) Int. Cl.
*G06F 3/0484* (2022.01)

(52) U.S. Cl.
CPC .. *G06F 3/0484* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 10,783,162 | B1 * | 9/2020 | Montague | G06F 16/26 |
| 11,991,198 | B1 * | 5/2024 | Kapoor | H04L 43/06 |
| 2003/0172371 | A1 | 9/2003 | Offenmuller | |
| 2006/0120279 | A1 * | 6/2006 | Mitsumori | H04L 12/437 370/222 |
| 2011/0116366 | A1 * | 5/2011 | Smith | H04L 45/02 370/256 |

(Continued)

FOREIGN PATENT DOCUMENTS

| | | |
|---|---|---|
| CN | 109933010 A | 6/2019 |
| CN | 109933018 A | 6/2019 |

(Continued)

OTHER PUBLICATIONS

Search Report for International Application No. PCT/CN2022/075083, 9 pages, Oct. 27, 2022.

(Continued)

*Primary Examiner* — Toan H Vu
(74) *Attorney, Agent, or Firm* — Slayden Grubert Beard PLLC

(57) ABSTRACT

Various embodiments include a workflow control method. An example includes: determining a type of a compositor node on the basis of an operation performed on a GUI by a user, wherein the compositor node comprises a start block to start execution of the compositor mode, an end block to end execution of the compositor node, and a plurality of working links arranged between the start block and the end block; determining a target working link from the plurality of working links based at least in part on the type of the compositor node; and controlling logic of a workflow based on the target working link, wherein the workflow is generated on the basis of a behavior tree comprising the compositor node.

16 Claims, 13 Drawing Sheets

(56) References Cited

U.S. PATENT DOCUMENTS

| | | | | |
|---|---|---|---|---|
| 2012/0010772 | A1 | 1/2012 | Pack et al. | 701/27 |
| 2019/0086894 | A1 | 3/2019 | Tenorth | |
| 2019/0171989 | A1 | 6/2019 | Smith | |
| 2020/0372016 | A1 * | 11/2020 | Rogynskyy | G06Q 10/10 |
| 2022/0309037 | A1 * | 9/2022 | Gutierrez | G06F 16/16 |
| 2023/0205496 | A1 * | 6/2023 | Lemos | G06F 8/34<br>717/109 |
| 2023/0215061 | A1 * | 7/2023 | Vijayaraghavan | G06Q 10/103<br>345/440 |
| 2024/0394414 | A1 * | 11/2024 | Radha | G06F 9/5044 |

FOREIGN PATENT DOCUMENTS

| | | | | |
|---|---|---|---|---|
| CN | 111079244 | A | 4/2020 | G06F 16/29 |
| CN | 112256248 | A | 1/2021 | |
| CN | 112835560 | A | 5/2021 | |
| CN | 113535836 | A | 10/2021 | |

OTHER PUBLICATIONS

"ISaGRAF—Software Release 5.0," XP007922142, ICS Triplex ISaGRAF Inc., 942 pages, Feb. 2006.

Ghzouli Razan, et al., "Behavior Trees in Action: A Study of Robotics Applications," Proceedings of the 23rd ACM/IEEE International Conference on Model Driven Engineering Languages and Systems: Companion Proceedings, ACMPUB27, pp. 196-209, Nov. 16, 2020.

Extended European Search Report, Application No. 22922906.7, 13 pages, Sep. 25, 2025.

* cited by examiner

WORKFLOW CONTROL METHOD, APPARATUS AND SYSTEM, AND MEDIUM AND PROGRAM PRODUCT

CROSS-REFERENCE TO RELATED APPLICATIONS

This application is a U.S. National Stage Application of International Application No. PCT/CN2022/075083 filed Jan. 29, 2022, which designates the United States of America, the contents of which are hereby incorporated by reference in their entirety.

TECHNICAL FIELD

The present disclosure relates to industrial processes. Various embodiments of the teachings herein include workflow control methods, apparatus, and/or systems, and computer-readable storage media and computer program products.

BACKGROUND

A workflow can be simply defined as to describe a series of operational processes. Workflows are widely used in automation systems, artificial intelligence, robotics, and other fields. For example, the workflow of a product sorting line in an automation system can be simply described as starting, taking pictures, classifying, and moving the product to a target location. The workflow of model deployment in artificial intelligence can be described as data collection, data annotation, model training, and model deployment.

However, currently these workflows only have textual descriptions. If users want to execute such workflows, they need to follow the textual descriptions and may use multiple engineering tools, which are almost unrelated to each other. As a result, completely different user operation behaviors are provided. This is not only a challenge to the users, but also greatly increases costs, reduces efficiency, and limits flexibility due to long development cycles. For example, in the field of artificial intelligence, the users need to use a tool for data collection, manually or use other tools for data annotation, write python scripts for model training, and deploy tools for deployment.

Therefore, those skilled in the art are still working on finding other workflow solutions.

SUMMARY

Various embodiments of the teachings herein include a workflow control method (600), comprising: determining a type of a compositor node on the basis of an operation performed on a graphical user interface by a user, wherein the compositor node comprises a start block suitable for starting execution of the compositor node, an end block suitable for ending execution of the compositor node, and a plurality of working links arranged between the start block and the end block (601); determining a target working link from the plurality of working links on the basis of the type of the compositor node (602); and controlling logic of a workflow on the basis of the target working link, wherein the workflow is generated on the basis of a behavior tree comprising the compositor node (603).

In some embodiments, at least one working link of the plurality of working links comprises a function block node, and the function block node is configured to implement a service operation in the workflow.

In some embodiments, the determining type of a compositor node on the basis of an operation performed on a graphical user interface by a user (602) comprises: determining type of the compositor node on the basis of a selection operation performed on the graphical user interface comprising a node library by the user, the node library comprising: a compositor node for identifying the type in a semantic manner or a compositor node for identifying the type in a presentation manner.

In some embodiments, the workflow control method (600) further comprises: receiving a behavior tree construction operation performed on the graphical user interface by the user, wherein the construction operation comprises an addition and connection operation of a behavior tree node, and the behavior tree node comprises the compositor node and the function block node; the behavior tree is used for representing the workflow, and the workflow is used for defining an operation to be executed by a work cell; and the function block node comprises: logic nodes, each logic node corresponding to an operation template, each operation template pre-defining at least one type of operation executable by a device, and the operation comprising: an action, a method or a skill; in response to the behavior tree construction operation, generating the behavior tree corresponding to the workflow, the logic nodes in the behavior tree being instantiated into operations of the corresponding devices; analyzing the behavior tree to acquire the workflow; and deploying the workflow to runtime of the corresponding work cell, so that each device in the work cell executes the operation according to the workflow, wherein the workflow is an OT domain workflow, and the device is an OT device.

In some embodiments, the workflow control method (600) further comprises generating a micro-service on the basis of the behavior tree, so that an IT device executes the OT domain workflow when calling the micro-service to trigger runtime of a main controller of the work cell.

In some embodiments, the type of the compositor node is Parallel; the determining a target working link from the plurality of working links (602) comprises: determining each working link of the plurality of working links as the target working link; and the method further comprises: receiving an end logic value through an input end of the end block, wherein when the end logic value is a logic AND, and the plurality of working links are executed completely, ending execution of the compositor node through the end block; and when the end logic value is a logic OR, and at least one working link of the plurality of working links is executed completely, ending execution of the compositor node through the end block.

In some embodiments, the type of the compositor node is Switch, and the method further comprises: receiving a preset composition expression through an input end of the start block; and the determining a target working link from the plurality of working links (602) comprises: determining a data value block when each working link is selected; and selecting a target working link conforming to the corresponding data value block from the plurality of working links on the basis of a computation result of the composition expression.

In some embodiments, the type of the compositor node is If-Then-Else, and the method further comprises: receiving a preset composition expression through an input end of the start block, a result of the composition expression comprising a logic true value or a logic false value; and the determining a target working link from the plurality of working links (602) comprises: determining a corresponding target working link from the plurality of working links on the basis of the result of the composition expression being the logic true value or the logic false value.

In some embodiments, the type of the compositor node is Priority, and the method further comprises: receiving a preset composition expression through an input end of the start block; and the determining a target working link from the plurality of working links (602) comprises: computing a data value block of each working link on the basis of the composition expression; determining a priority rank of the plurality of working links on the basis of a ranking result of the data value block of each working link; and determining the target working link from the plurality of working links on the basis of the priority rank.

In some embodiments, the type of the compositor node is Reactive Priority, and the method further comprises: receiving a first composition expression and a second composition expression through an input end of the start block; and the determining a target working link from the plurality of working links (602) comprises: computing a first data value block of each working link on the basis of the first composition expression; computing a second data value block of each working link on the basis of the second composition expression; determining a priority rank of the plurality of working links on the basis of a ranking result of the first data value blocks of the plurality of working links; and determining the target working link from the plurality of working links on the basis of the priority rank and the second data value block of each working link.

In some embodiments, the workflow control method (600) further comprises displaying the compositor node in a folding mode in a folding frame (90) on the graphical user interface, wherein the folding frame (90) comprises a first display area (88), and the first display area (88) is suitable for displaying a currently displayed working link of the compositor node and hiding working links except the currently displayed working link.

In some embodiments, the folding frame (90) further comprises a second display area (83), a third display area (81) and a switch control (84); the second display area (83) is suitable for displaying a data value block of the currently displayed working link; the third display area (81) is suitable for displaying a label of the currently displayed working link; and the switch control (84) is suitable for switching the currently displayed working link among the plurality of working links.

As another example, some embodiments include a workflow control apparatus (800), comprising: a first determination module (801) configured to determine type of a compositor node on the basis of an operation performed on a graphical user interface by a user, wherein the compositor node comprises a start block suitable for starting execution of the compositor node, an end block suitable for ending execution of the compositor node, and a plurality of working links arranged between the start block and the end block; a second determination module (802) configured to determine a target working link from the plurality of working links on the basis of the type of the compositor node; and a control module (803) configured to control logic of a workflow on the basis of the target working link, wherein the workflow is generated on the basis of a behavior tree comprising the compositor node.

In some embodiments, the first determination module (801) is configured to determine the type of the compositor node on the basis of a selection operation performed on the graphical user interface comprising a node library by the user, the node library comprising: a compositor node for identifying the type in a semantic manner or a compositor node for identifying the type in a presentation manner.

In some embodiments, at least one working link of the plurality of working links comprises a function block node, and the function block node is configured to implement a service operation in the workflow; the first determination module (801) is configured to receive a behavior tree construction operation performed on the graphical user interface by the user, wherein the construction operation comprises an addition and connection operation of a behavior tree node, and the behavior tree node comprises the compositor node and the function block node; the behavior tree is used for representing the workflow, and the workflow is used for defining an operation to be executed by a work cell; and the function block node comprises: logic nodes, each logic node corresponding to an operation template, each operation template pre-defining at least one type of operation executable by a device, and the operation comprising: an action, a method or a skill; in response to the behavior tree construction operation, generating the behavior tree corresponding to the workflow, the logic nodes in the behavior tree being instantiated into operations of the corresponding devices; analyzing the behavior tree to acquire the workflow; and deploying the workflow to runtime of the corresponding work cell, so that each device in the work cell executes the operation according to the workflow, wherein the workflow is an OT domain workflow, and the device is an OT device.

As another example, some embodiments include a workflow control system, comprising: at least one memory (51) configured to store computer-readable codes; and at least one processor (52) configured to call the computer-readable codes and execute one or more of the workflow control methods described herein.

As another example, some embodiments include a computer-readable medium, storing computer-readable instructions thereon, when executed by a processor, the computer-readable instructions causing the processor to execute one or more of the workflow control methods described herein.

As another example, some embodiments include a computer program product, stored on a computer-readable medium in a tangible manner and comprising computer-readable instructions, when executed, the computer-readable instructions causing at least one processor to execute one or more of the workflow control methods described herein.

Figure 1A:
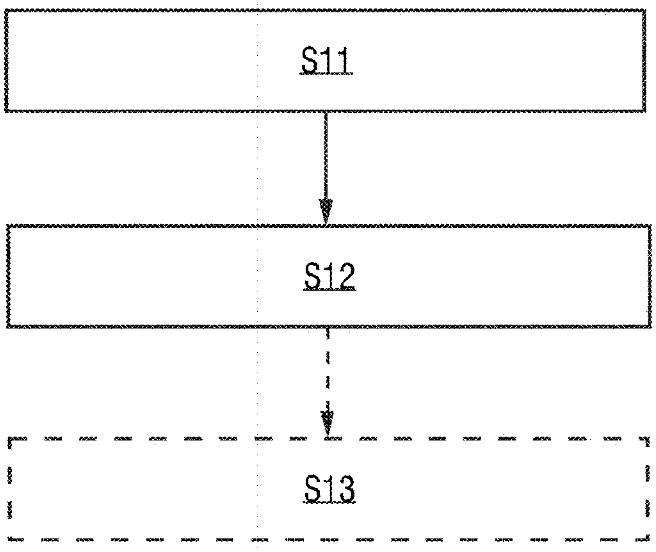
FIG. 1A is a flowchart of an example workflow creation method incorporating teachings of the present disclosure.

| | |
|---|---|
| S11-S13 | Steps in workflow creation method |
| 110 | Node library |
| 120 | Graphical interface module |
| 130 | Editing processing module |
| 140 | Analysis deployment module |
| 100 | OT domain low-code development platform |
| 10 | OT domain low-code development tool |
| 20 | OT domain micro-service generator |
| 30 | Runtime on main controller of work cell |
| 40 | Micro-service |
| 50 | Third-party apparatus |
| 200 | Knowledge middle platform |
| 300 | IT domain code development platform |
| 301 | IT domain code development tool |
| 51 | At least one memory |
| 52 | At least one processor |
| 53 | At least one display |
| 54 | BUS |
| 600 | Workflow control method |
| 601-603 | Steps |
| 70 | Compositor node |
| 71 | Start block |
| 72 | End block |
| 73-75 | Function block node |
| 76 | Composition expression |
| 77 | End logic value |
| 78-80 | Data value block |
| 81 | Third display area |
| 82 | Type identifier of folding compositor |
| 83 | Second display area |
| 84 | Switch control |
| 85-86 | Function block node |
| 87 | Composition expression |
| 88 | First display area |
| 90 | Folding frame |
| 800 | Workflow control apparatus |
| 801 | First determination module |
| 802 | Second determination module |
| 803 | Control module |

DETAILED DESCRIPTION

Various embodiments of the teachings of the present disclosure includes workflow control methods and systems, computer-readable storage media, and computer program products. For example, some embodiments include a workflow control method comprising: determining type of a synthesizer node on the basis of an operation performed on a graphical user interface by a user, where the synthesizer node includes a start block suitable for starting execution of the synthesizer node, an end block suitable for ending execution of the synthesizer node, and multiple working links arranged between the start block and the end block; determining a target working link from the multiple working links on the basis of the type of the synthesizer node; and controlling logic of a workflow on the basis of the target working link, where the workflow is generated on the basis of a behavior tree including the synthesizer node. Therefore, various types of synthesizer nodes are introduced, so as to be applied to flexibly controlling the workflow.

In some embodiments, at least one working link of the multiple working links includes a function block node, and the function block node is configured to implement a service operation in the workflow. Therefore, the working link of the synthesizer node can include the function block node, thereby improving the control capability of the function block node.

In some embodiments, the determining type of a synthesizer node on the basis of an operation performed on a graphical user interface by a user includes: determining the type of the synthesizer node on the basis of the operation performed on the graphical user interface including a node library by the user, the node library including: a synthesizer node for identifying the type in a semantic manner or a synthesizer node for identifying the type in a presentation manner. Therefore, the type of the synthesizer node can be identified in the semantic manner or the presentation manner, the identification difficulty of the synthesizer node can be reduced, and canvas resources can be saved.

In some embodiments, the method further includes: receiving a behavior tree construction operation performed on the graphical user interface by the user, where the construction operation includes an addition and connection operation of a behavior tree node, and the behavior tree node includes the synthesizer node and the function block node; the behavior tree is used for representing the workflow, and the workflow is used for defining an operation to be executed by a work cell; and the function block node includes: logic nodes, each logic node corresponding to an operation template, each operation template pre-defining at least one type of operation executable by a device, and the operation including: an action, a method or a skill; in response to the behavior tree construction operation, generating the behavior tree corresponding to the workflow, the logic nodes in the behavior tree being instantiated into operations of the corresponding devices; analyzing the behavior tree to acquire the workflow; and deploying the workflow to runtime of the corresponding work cell, so that each device in the work cell executes the operation according to the workflow, where the workflow is an OT domain workflow, and the device is an OT device. Therefore, the synthesizer node can be applied to the workflow control method of an OT domain.

In some embodiments, the method further includes: generating a micro-service on the basis of the behavior tree, so that an IT device executes the OT domain workflow when calling the micro-service to trigger runtime of a main controller of the work cell. Therefore, mutual fusion of the IT domain and the OT domain can be realized in a micro-service mode.

In some embodiments, the type of the synthesizer node is Parallel; the determining a target working link from the multiple working links includes: determining each working link of the multiple working links as the target working link; and the method further includes: receiving an end logic value through an input end of the end block, where when the end logic value is a logic AND, and the multiple working links are executed completely, ending execution of the synthesizer node through the end block; and when the end logic value is a logic OR, and at least one working link of the multiple working links is executed completely, ending execution of the synthesizer node through the end block. Therefore, the synthesizer node may have a parallel capability.

In some embodiments, the type of the synthesizer node is Switch, and the method further includes: receiving a preset composition expression through an input end of the start block; and the determining a target working link from the multiple working links includes: determining a data value block when each working link is selected; and selecting a target working link conforming to the corresponding data value block from the multiple working links on the basis of a computation result of the composition expression. Therefore, the synthesizer node may have a switch capability.

In some embodiments, the type of the synthesizer node is If-Then-Else, and the method further includes: receiving a preset composition expression through an input end of the start block, a result of the composition expression including a logic true value or a logic false value; and the determining a target working link from the multiple working links a includes: determining corresponding target working link from the multiple working links on the basis of the result of the composition expression being the logic true value or the logic false value. Therefore, the synthesizer node may have an If-Then-Else capability.

In some embodiments, the type of the synthesizer node is Priority, and the method further includes: receiving a preset composition expression through an input end of the start block; and the determining a target working link from the multiple working links includes: computing a data value block of each working link on the basis of the composition expression; determining a priority rank of the multiple working links on the basis of a ranking result of the data value block of each working link; and determining the target working link from the multiple working links on the basis of the priority rank. Therefore, the synthesizer node may have a priority capability.

In some embodiments, the type of the synthesizer node is Reactive Priority, and the method further includes: receiving a first composition expression and a second composition expression through an input end of the start block; and the determining a target working link from the multiple working links includes: computing a first data value block of each working link on the basis of the first composition expression; computing a second data value block of each working link on the basis of the second composition expression; determining a priority rank of the multiple working links on the basis of a ranking result of the first data value blocks of the multiple working links; and determining the target working link from the multiple working links on the basis of the priority rank and the second data value block of each working link. Therefore, the synthesizer node may have a reactive priority capability.

In some embodiments, the method includes: displaying the synthesizer node in a folding mode in a folding frame on the graphical user interface, where the folding frame includes a first display area, and the first display area is suitable for displaying a currently displayed working link of the synthesizer node and hiding working links except the currently displayed working link. Therefore, the synthesizer node may have a folded structure, which can save the canvas resources.

In some embodiments, the folding frame further includes a second display area, a third display area and a switch control; the second display area is suitable for displaying a data value block of the currently displayed working link; the third display area is suitable for displaying a label of the currently displayed working link; and the switch control is suitable for switching the currently displayed working link among the multiple working links. Therefore, the synthesizer node having the folded structure can flexibly switch the currently displayed working link and flexibly display the label of the working link.

Some embodiments of the teachings herein include a workflow control apparatus, including: a first determination module configured to determine a type of a synthesizer node on the basis of an operation performed on a graphical user interface by a user, where the synthesizer node includes a start block suitable for starting execution of the synthesizer node, an end block suitable for ending execution of the synthesizer node, and multiple working links arranged between the start block and the end block; a second determination module configured to determine a target working link from the multiple working links on the basis of the type of the synthesizer node; and a control module configured to control logic of a workflow on the basis of the target working link, where the workflow is generated on the basis of a behavior tree including the synthesizer node. Therefore, various types of synthesizer nodes are introduced, so as to be applied to flexibly controlling the workflow.

In some embodiments, the first determination module is configured to determine the type of the synthesizer node on the basis of a selection operation performed on the graphical user interface including a node library by the user, the node library including: a synthesizer node for identifying the type in a semantic manner or a synthesizer node for identifying the type in a presentation manner. Therefore, the type of the synthesizer node can be identified in the semantic manner or the presentation manner, the identification difficulty of the synthesizer node can be reduced, and canvas resources can be saved.

In some embodiments, at least one working link of the multiple working links includes a function block node, and the function block node is configured to implement a service operation in the workflow; the first determination module is configured to receive a behavior tree construction operation performed on the graphical user interface by the user, where the construction operation includes an addition and connection operation of a behavior tree node, and the behavior tree node includes the synthesizer node and the function block node; the behavior tree is used for representing the workflow, and the workflow is used for defining an operation to be executed by a work cell; and the function block node includes: logic nodes, each logic node corresponding to an operation template, each operation template pre-defining at least one type of operation executable by a device, and the operation including: an action, a method or a skill; in response to the behavior tree construction operation, generating the behavior tree corresponding to the workflow, the logic nodes in the behavior tree being instantiated into operations of the corresponding devices; analyzing the behavior tree to acquire the workflow; and deploying the workflow to runtime of the corresponding work cell, so that each device in the work cell executes the operation according to the workflow, where the workflow is an OT domain workflow, and the device is an OT device. Therefore, the synthesizer node can be applied to the workflow control process of an OT domain.

Some embodiments include a workflow control system, including: at least one memory configured to store computer-readable codes; and at least one processor configured to call the computer-readable codes and execute any one of the steps in the workflow control method.

Some embodiments include a computer-readable medium, storing computer-readable instructions thereon, when executed by a processor, the computer-readable instructions causing the processor to execute any of the workflow control methods described herein.

Some embodiments include a computer program product, stored on a computer-readable medium in a tangible manner and including computer-readable instructions, when executed, the computer-readable instructions causing at least one processor to execute one or more of the workflow control methods described herein.

Discussion of the various embodiments herein is merely intended to make a person skilled in the art better understand and implement the subject described in this specification and is not intended to limit the protection scope of the claims, the applicability, or examples. Changes may be made to the functions and arrangements of the discussed elements without departing from the protection scope of the content of the embodiments of the present application. Various processes or components may be omitted, replaced, or added in examples according to requirements. For example, the described method may be performed according to a sequence different from the sequence described herein, and steps may be added, omitted, or combined. In addition, features described in some examples may also be combined in other examples.

As used in this specification, the term "include" and variants thereof represent open terms, and means "include but is not limited to". The term "based on" represents "at least partially based on". The terms "one embodiment" and "an embodiment" represent "at least one embodiment". The term "another embodiment" represents "at least one another embodiment". The terms "first", "second", and the like may represent different objects or the same object. Other definitions may be included explicitly or implicitly in the following. Unless otherwise clearly specified, the definition of one term is consistent in the entire specification.

FIG. 1A shows a flowchart of a workflow creation method incorporating teachings of the present disclosure. As shown in FIG. 1A, the method may include the following:

S11: A behavior tree construction operation performed by the user on a graphical user interface on the basis of a preset behavior tree node is received. One behavior tree represents one workflow, and the workflow defines an operation to be executed by one work cell, for example, it may represent a distributed process in the work cell. During implementation, the workflow herein can be subdivided into a main workflow and sub workflows. The main workflow is used for limiting starting, ending and triggering other flow control of the whole work cell process. The main workflow is an entrance of the whole process and is linked to at least one sub workflow. The sub workflows are usually major workflows, and each sub workflow corresponds to one sub-flow and is used for implementing a specific service operation.

The work cell can be a combination of resources such as a system or device that can implement a relatively complete and independent control process and operation. In this embodiment, the workflow is created by taking the work cell as a basic unit, so that the characteristics of industrial control are better met, the development integration level can be improved, and the development complexity is reduced. For example, taking the industrial technical field as an example, the work cell can be defined according to an actual industrial scenario, for example, one process can be defined to correspond to one work cell, or one workstation in the process can be defined to be one work cell, or one station in the workstation can be defined to correspond to one work cell, and the process flows of different work cells are different.

The behavior tree is a formal graphical modeling mode. The behavior tree is widely applied to various artificial types of intelligent decisions. Most logics are set according to rules, so that the judgment on behaviors is similar to a tree having multiple judgment branches. The behavior of the behavior tree is the leaf nodes and is a behavior logic to be executed truly. Through the behavior tree mode, clearly defined symbols can be adopted to clearly represent related requirements of a software integration system. The structure of the behavior tree is organized in a tree form, each node has a printed node type, and different functions are carried in cooperation with related parameters. An intuitive and visual behavior tree editor can be provided for a user in a component editor mode. By using the behavior tree editor, the user can quickly edit the behavior tree. For example, after the behavior tree editor is started, a new behavior tree can be established, then a behavior tree node type is selected into the behavior tree, and attributes of behavior tree nodes forming the behavior tree can be edited.

The behavior tree nodes can include: the flow control nodes, the function block nodes and the like. The detailed description is shown as follows.

I. Flow Control Node

The flow control node is configured to implement logic control over the workflows and is generally independent of specific service operation in the work cell. Through the flow control node, the user can create various workflows according to own requirements. During implementation, the flow control node can include: a main control node, a compositor node (also called an aggregator node or a logic control node), a condition node and the like. Alternatively, the flow control node can include: one or any combination of the main control node, the compositor node and the condition node. A brief description is provided below.

1. Main Control Node

The main control node can include: part or all of a start node, an end node, a goto node, an anchor node, a stop node, and an abort node. The main control node in this embodiment is not a standard behavior tree element, but it can be configured to control the main process of the workflow and can be linked to a state machine of the workflow in this embodiment. The start node is mandatory, and one of the end node or the goto node can be mandatory. The main control node is mainly configured to define the start and end of the workflow. In addition, other element nodes can control the state machine (such as abort and top) or label key process steps (such as anchor node) that can be skipped.

2. Compositor Node

The compositor node is configured to implement logic control over the workflow. The compositor node can include: part or all of an Se (Sequence) node, an RSe (Reactive Sequence) node, a Pa (Parallel) node, an IPQ (In-Process QC) node, a Pr (Priority (Fallback)) node, an RPr (Reactive Priority (Fallback)) node, an ITE (If-Then-Else) node, and an Sw (Switch) node. The compositor node can define how to execute branches in the behavior tree and is configured to implement branch logic control and the like in a workflow. For example, typical compositor nodes are simply described as follows:

1) Se node: it may have one or more child nodes and can sequentially trigger routes to each child node according to the sequence of the workflow.

2) RSe node: it has the same function as that of the Se node, but will continuously check a trigger condition.

3) Pa node: it may have one or more child nodes, which are started in sequence from top to bottom, and all the child nodes are executed in multiprocess or multithreading at the same time.

4) IPQ node: it refers to that a quality engineer performs quality inspection on a part of process steps, executes an abnormal processing flow if the inspection fails, and continues if the inspection succeeds.

5) Pr node: the sub-branches are executed in sequence according to priorities, the next sub-branch will be executed if the previous execution fails, and it passes when the execution of any branch is successful.

6) RPr node: it has the same function as that of the Pr node, but will continuously check the trigger condition.

7) If-Then-Else node: a trigger expression is checked, and if it is true, a true branch will be executed; and if it is a false, a false branch will be executed.

8) Sw node: the trigger expression is checked, different branches are executed according to different conditions, and if all are not met, a default branches will be executed.

Generally, the Se node and the Pa node can drive most logic in the workflow.

3. C (Condition) Node

The C node is generally a basic logic element for checking the expression in the behavior tree and is configured to execute condition judgment and return a judgment result. It returns to success or failure on the basis of whether the condition is met. The C node never returns to the running state. In addition, in other embodiments, the C node may also be included in the function block node. In some embodiments, the C node may also be independently used as a class of nodes.

II. FB (Function Block) Node

The FB node is configured to execute a command to implement a service operation in the workflow. Generally, if the operation is correctly completed, it returns to success; and if the operation fails, it returns to failure. When the operation is being carried out, it returns to the running state. The FB node includes a logic node and may also include some specific types of FB nodes, for example, part or all of a manual node, a dynamic node, a delay node and an empty (idle) node may be included. The dynamic node is configured to dynamically inject a node instance during operation.

The manual node represents a manual step, and it stops at the current node before acquiring a confirmation signal, and exits after acquiring the confirmation signal. The delay node represents exiting the current node after delaying for a specified time. The empty (idle) node represents not executing any operation, and a placeholder can be replaced by any FB node. Each logic node can correspond to an operation template, and each operation template pre-defines at least one type of operation executable by resources (such as cooperative robots or PLC-type devices), for example, the operation can include: an action, a method or a skill.

During implementation, each operation template can be composed of an interface part and an implementation part. The implementation part may be an application (e.g., a containerized application) which includes function codes and operation dependency items. The application can run independently and is disclosed to the outside through a specific network communication interface. The interface part can be a logic node presented in a graphical element, namely, it can be dragged and dropped, connected and configured in the graphical user interface like other behavior tree nodes. During implementation, each logic node can be provided with a parameter panel used for configuring parameters of the logic node, such as input and output parameters. Definitely, the input and output parameters can also be preset with default values.

Each logic node can be independently configured and executed. When the logic node in the behavior tree is executed, the input configured by the user for the logic node is read and transmitted to the implementation part of the operation template, namely the corresponding application program. After a specific operation such as model conversion is completed, the operation result such as the converted model is converted back to the output of the logic node. The interface part and the implementation part of each operation template can be independently stored. For example, only the interface part, namely the logic node, can be stored in the node library, the implementation part of the node library can be stored in the node service module, and the node service module can be called runtime in this embodiment. The node service module can be located in a server or can also be located locally.

In some embodiments, the logic node follows an information model interacted with a main controller during operation. Therefore, the standardization of communication between the OT domain workflow and the main controllers of various OT devices is realized. In addition, because the service operation corresponding to one FB node may be executed by different subjects, for example, it may be a specific physical device, may be a certain person, and may also be other virtual noun resources. To facilitate description, the physical devices, personnel, virtual noun resources and the like are collectively called as resources, and the resources generally refer to resources which can execute the workflow on site and serve as operation subjects.

During implementation, the resources serving as the operation execution subjects can serve as a common configuration parameter of the FB node, and corresponding resource configuration is carried out on the needed FB node when creating the behavior tree; or, when creating the FB node, the resources serving as the operation execution subjects are configured for the FB node, and therefore resource configuration does not need to be carried out on the needed FB node when creating the behavior tree. Alternatively, to facilitate management of resources, the resources can be represented in a form of resource nodes, and the resource nodes can be stored in a form of a resource knowledge graph. The resource knowledge graph includes: each resource node, and a connecting line representing the relationship between the resource nodes.

Figure 1B:
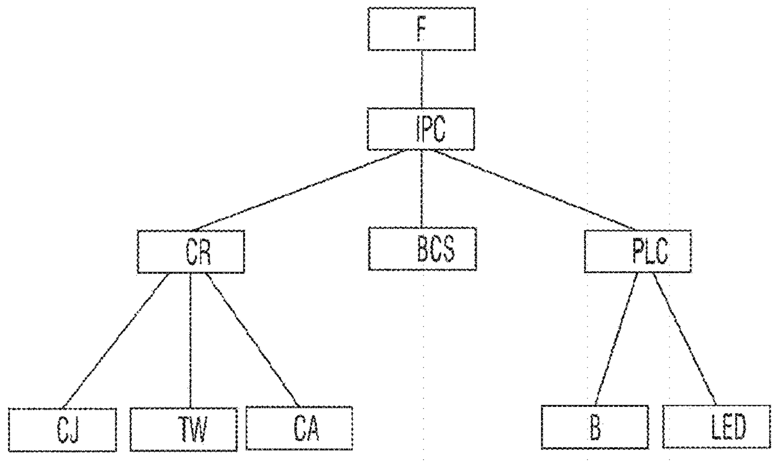
FIG. 1B is a diagram of a resource knowledge graph incorporating teachings of the present disclosure.

For example, FIG. 1B is an example diagram of a resource knowledge graph in one example. As shown in FIG. 1B, the resource knowledge graph is a factory resource knowledge graph, namely, a real system configuration of a factory is described. An F (Factory) node is provided with an IPC (Industrial Personal Computer) node, and the IPC node is provided with a CR (Cooperative Robot) node, a PLC node and a BCS (Bar Code Scanner) node. The CR node is provided with a CJ (Clamping Jaw) node, a TW (Torque write) node and a CA (Camera) node; and the PLC node is provided with a B (Button) node and an LED alarm lamp node. Definitely, in some applications, if some type of device such as a CR may be more than one, each device of this type of device can be distinguished through labels or models, which will not be one by one repeated here.

Each FB node can be instantiated into an operation of a corresponding resource by associating with a resource node. For example, a certain logic node can be instantiated into operation of a corresponding device by associating with a device resource node. During implementation, a header can be set for the FB node, and the resource associated with the FB node can be displayed in the header.

Figure 1C:
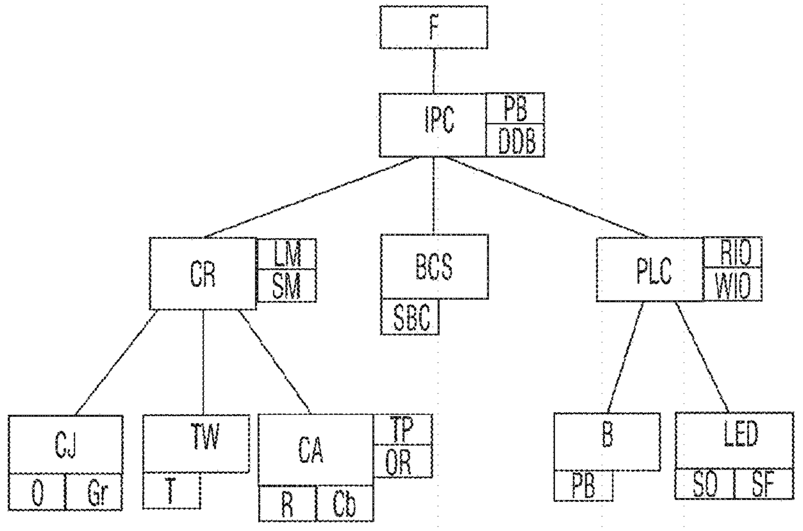
FIG. 1C is a diagram of associating a function block node for each resource node incorporating teachings of the present disclosure.

The specific association process may be implemented in different modes. For example, each resource node can be associated with a corresponding FB node in advance, so that when creating the behavior tree, the FB node associated with the corresponding resource can be directly pulled, and temporary configuration is not needed. For example, FIG. 1C is an example diagram of associating a function block node for each resource node in one example. As shown in FIG. 1C, the corresponding function block nodes are associated with the resources shown in the resource knowledge graph in FIG. 1B. The IPC node is associated with a PB (Press Button) node and a DDB (Display Dialog Box on Screen) node; the CR (Cooperative Robot) node is associated with an LM (Linear Move) node and an SM (Shutdown Mobile) node; the PLC node is associated with an RIO (Read I/O) node and a WIO (Write I/O) node; the BCS (Bar Code Scanner) node is associated with an SBC (Scan Bar Code) node; the CJ (Clamping Jaw) node is associated with an O (Open) node and a Gr (Grab) node; the TW (Torque Wrench) node is associated with a T (Twist) node; the CA (Camera) node is associated with an R (Register) node, a Cb (Calibration) node, an TP (Take Photo) node, an OR (Object Recognition) node; a B (Button) node is associated with the PB (Press Button) node; and the LED alarm lamp node is associated with an SO (Switch On) node and an SF (Switch Off) node.

In some embodiments, the resource nodes are not associated with the FB nodes in advance, and corresponding resource nodes are associated with the needed FB nodes when creating the behavior tree.

In some embodiments, the FB nodes associated with the resource nodes in advance (can be called as special FB nodes) and the FB nodes not associated with the resource nodes (can be called as universal function block nodes) can exist at the same time. Although the universal FB nodes are not associated with field resources, analog simulation of workflows corresponding to the behavior tree including the FB nodes is not affected. For example, a certain CR is not purchased yet, and to verify the feasibility, the corresponding universal FB nodes can be adopted in advance for simulation, and when it is determined that it has feasibility, purchase can be performed.

In addition, it can further include the following decorator nodes:

III. Decorator Nodes

The decorator nodes are mainly configured to decorate the FB nodes driven by the compositor nodes, for example, the decorator nodes can be configured to determine whether branches in the behavior tree or even a single node can be executed or not. The decorator nodes can include: part or all of an Rp (Repeat) node, an Rt (Retry) node, an OS (One-Shot) node, a TO (Timeout) node, a Tm (Timer) node, an Iv (Inverter) node, an FR (Force Run) node, an FO (Force OK) node, an FF (Force Failed) node and a G (Guard) node. Some decorator nodes are briefly described as follows:

1) Iv node: it may have a child node and is configured to invert the child node. If the child node fails, it returns to success; and if the child node is successful, it returns to failure.

2) FO node: it may have a child node (such as an FB node), and the node always returns to success no matter whether the child node is successful or not.

3) FF node: it may have a child node (such as an FB node), and the node always returns to failure no matter whether the child node is successful or not.

4) Rp node: it may have a child node (such as an FB node), and the child node can be repeatedly executed for a fixed number of times.

5) Rt node: it may have a child node (such as an FB node), and the child node can be triggered for N times at most; if the child node returns to failure, the retry is carried out and the number of times is subtracted by one, and when the number of times of retry is zero, it returns to success; and if the child node returns to success, the loop is interrupted, and it also returns to success. N is a positive integer.

6) OS node: it may have a child node, which represents that the child node is executed only once in the workflow and is not executed before the workflow is restarted.

7) TO node: it may have a child node and is configured to count the execution time of the child node (such as an FB node), and it exits execution (even if the execution is not completed) after the specified time is exceeded.

8) Tm node: it may have a child node, and the child node (such as an FB node) is executed after the specified time is reached.

9) FR node: it may have a child node, and it will be forced to return to the running state no matter whether the child node (such as an FB node) is executed or not.

10) G node: it may have at least one child node configured to guard the state of all the child nodes. When any child node is executed in an error, it reports an error. When all child nodes are normal, it returns to normal.

In some embodiments, the decorator node can also be included in the flow control node. That is, the flow control node can include: all or part of the main control node, the compositor node and the decorator node. Each behavior tree node can be listed on the graphical user interface in a form of an icon, and the user can determine the node required to create the workflow by selecting, dragging and adding the icon to the canvas, and further, the node can be subjected to necessary parameter configuration, such as resource configuration and/or input/output parameter configuration. If an operation to be performed by the work cell, that is, the operation defined in the required workflow is more than one, the behavior tree corresponding to the workflow can include multiple FB nodes, the corresponding flow control nodes can be set according to the sequence and correlation of the operations, and the behavior tree corresponding to the workflow can be finally generated by performing corresponding arrangement and connection on the dragged nodes. That is, the behavior tree construction operation includes adding and connecting the behavior tree nodes. Further, the method includes an operation of associating resources for the added FB nodes. In addition, the method further includes: an operation of configuring input/output parameters for the behavior tree nodes.

Step S12: In response to the behavior tree construction operation, the behavior tree corresponding to the workflow is generated, the logic nodes in the behavior tree being instantiated into operations of the corresponding device. In response to the behavior tree construction operation, each behavior tree node can be instantiated, and a connection relationship between the instantiated behavior tree nodes is established. For example, by executing this step, the added logic node can be instantiated as the operation of the corresponding device. Then the behavior tree corresponding to a workflow is generated on the basis of the connection relationship between the instantiated behavior tree nodes.

During implementation, the behavior tree nodes can be stored in the node library. In addition, for similar application scenarios, to avoid waste of manpower, time and the like for repeatedly constructing the behavior tree, a behavior tree (or a non-instantiated behavior tree framework) corresponding to a workflow or a corresponding subworkflow which is constructed by the user and is preferably debugged or successfully operated is stored as a workflow node or a subworkflow node. Correspondingly, the node library can further include a WF (WorkFlow) node, and an SWF (SubWorkFlow) node. When the user needs to construct a similar behavior tree or construct a behavior tree including the WF or the SWF, a corresponding WF node or SWF node can be selected and necessarily configured so as to obtain a behavior tree for realizing the required WF.

Figure 2A:
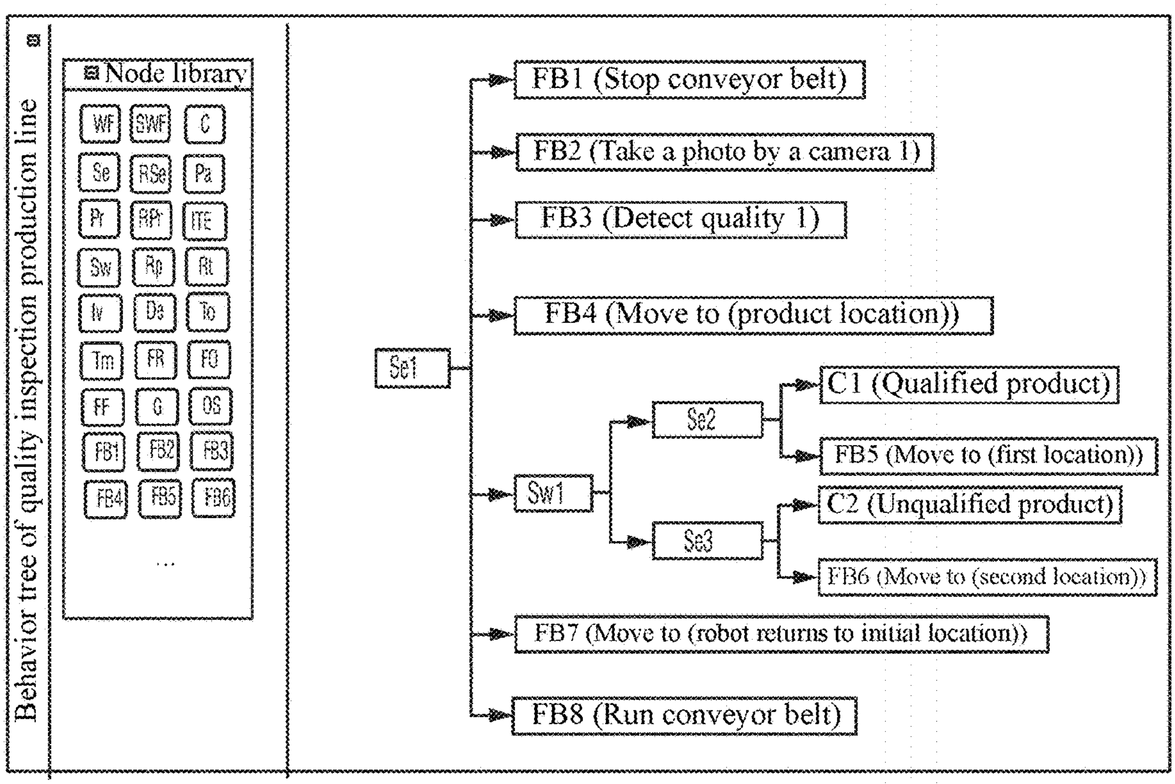
FIG. 2A is a schematic diagram of a behavior tree created incorporating teachings of the present disclosure.
Figure 2B:
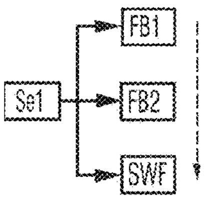
FIG. 2B to FIG. 2S are corresponding schematic diagrams of part of behavior trees created incorporating teachings of the present disclosure.
Figure 2C:
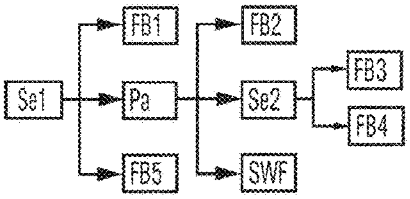
Figure 2D:
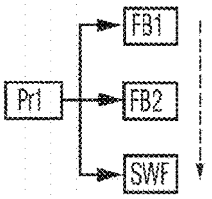
Figure 2E:
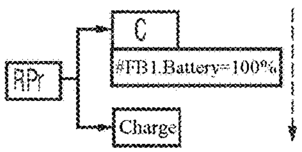
Figure 2F:
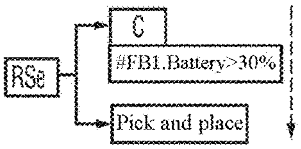
Figure 2G:
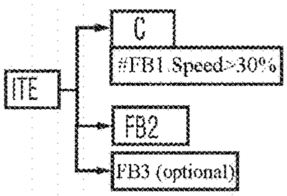
Figure 2H:
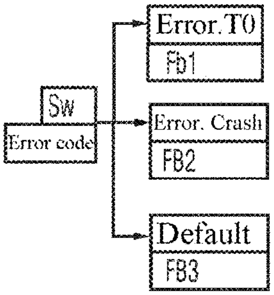
Figure 2I:
Figure 2J:
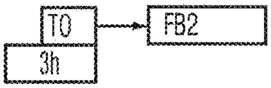
Figure 2K:
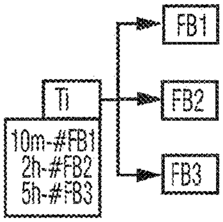
Figure 2L:
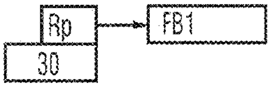
Figure 2M:
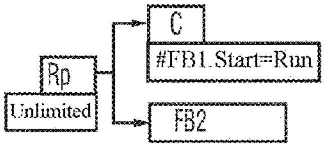
Figure 2N:
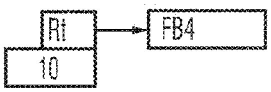
Figure 2O:
Figure 2P:
Figure 2Q:
Figure 2R:
Figure 2S:
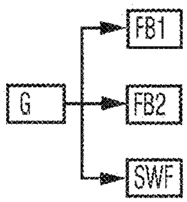

FIG. 2A is a schematic diagram of a behavior tree for constructing a work cell of a quality inspection production line in one example. FIG. 2B to FIG. 2S are corresponding schematic diagrams of part of behavior trees created in one example. In some embodiments, the method includes the following step S13, shown as a dotted line in FIG. 1.

Step S13: The behavior tree is analyzed, and the workflow corresponding to the behavior tree is deployed to runtime of the corresponding work cell, so that each resource in the work cell executes the operation according to the workflow. During implementation, the work cell can be provided with a main controller, and in this case, it can be on the main controller of the work cell during running. Correspondingly, the device resource of the resources can be connected to the main controller, and the main controller controls the connected device resource to execute corresponding operations according to the workflow during running; and human resources and the like in the resources can directly execute corresponding operations according to the workflow prompt during running.

The behavior tree can be stored in a Markup language such as XML (Extensive Markup Language), and can be verified by an XML Schema (XSD) prototype to verify that the XML format of the behavior tree is correct. After the behavior tree is analyzed, a workflow represented in "a node link assembly" form can be obtained, and then the workflow is compiled and downloaded to the runtime of the main controller of the corresponding work cell.

According to the definition of the Gartner, the OT domain generally refers to an operation technology (OT), which integrates hardware and software, and detects or triggers the change or the event of the process in an enterprise by directly monitoring and/or controlling a physical device (called OT device). The OT monitors or changes the physical state of an industrial control system (ICS) with a computer. The industrial control system is a facility, a system and a device implemented on the basis of the computer and is used for remotely monitoring and/or controlling a key industrial process, so as to realize a physical function. The "OT" is used for distinguishing the industrial control a system from traditional information technology (IT) system in technical implementation and function.

At present, there are multiple IT low-code development tools or platforms in the market. Part of the tools are oriented to the use scenario of the Internet of Things as well as the experienced IT engineers, and OT engineers and primary IT engineers are difficult to understand the paradigms of the tools. Part of the tools are more applicable to the use scenario of IT domain low-code development and cannot be well applicable to the OT domain.

The workflow creation methods described herein can be used for the OT domain and serves as an OT domain low-code development method. Specifically, the workflow creation method shown in FIG. 1A can be implemented on an OT domain such as an OT domain low-code development platform, and correspondingly, the workflow can be an OT domain workflow; the work cell can be a work cell in an OT domain; and the device can be an OT device. The OT device can include but is not limited to an Internet of Things (IoT) device, a programmable logic controller (PLC), robotics, a manual process, an industrial personal computer (IPC) and the like.

Considering that the integration of the IT domain and OT domain is becoming increasingly important in the process of digital transformation of enterprises, to integrate the IT domain and OT domain into an ITOT system, a problem that needs to be solved urgently is how enterprises can collect OT domain data and control OT domain processes in a way that is easy to understand rather than IT domain programming.

The workflow creation methods described herein can be used for this ITOT system and serves as an OT domain low-code development method in which IT domain can be fused. Similarly, the workflow creation method shown in FIG. 1A can be implemented on the OT domain such as the OT domain low-code development platform, and correspondingly, the workflow can be an OT domain workflow; and the work cell can be a work cell in the OT domain. To realize the fusion of the IT domain and the OT domain, on the basis of the workflow creation method shown in FIG. 1A, the method further includes: generating a micro-service on the basis of the behavior tree, so that the IT device executes the OT domain workflow when calling the micro-service to trigger the runtime of the main controller of the work cell. During implementation, the IT device can directly call or call the micro-service through a knowledge middle platform.

During generating the micro-service on the basis of the behavior tree, APE of the micro-service can be generated on the basis of the behavior tree, and the processing process in the API includes each operation in the OT domain workflow, input parameters of the API are parameters acquired by an input port of the OT domain workflow, and output parameters of the API are parameters outputted by an output port of the OT domain workflow. If the IT domain needs to call the micro-service, the IT domain needs to acquire the information of the micro-service. The implementation modes include but are not limited to the following two modes:

Mode I:

In the Mode I, a code developer of the OT domain can notify the code developer of the IT domain of the generated name and IP address of each generated micro-service, so that the code developer of the IT domain can directly write the information of each micro-service into the code in the development process, thereby realizing the calling of the IT device to the micro-service. The Mode I is relatively suitable for scenarios with a small number of micro-services.

Mode II:

In the Mode II, a registration and discovery mechanism can be adopted. That is, each micro-service is registered on the knowledge middle platform, so that an IT domain code development tool enables the IT device to discover the connected micro-service through the knowledge middle platform. During implementation, the IT domain code development tool can be utilized to enable the IT domain device to discover the connected micro-services through code development using the knowledge middle platform. An apparatus which completes the micro-service registration can be an OT domain micro-service generator or a third-party apparatus. The third-party apparatus can be regarded as a part of the OT domain low-code development platform, or is implemented in the knowledge middle platform. The Mode II is relatively suitable for scenarios with a large number of micro-services.

The IT devices can include but are not limited to: a manufacturing operation management (MOM) system, a Manufacturing Execution System (MES), an enterprise resource planning (ERP) system, an enterprise service bus (ERP), a product lifecycle management (PLM) system and the like. Because the IT domain code development tool can perform programming to realize that the IT device executes the OT domain workflow when calling the micro-service to trigger the runtime of the main controller of the work cell through the knowledge middle platform, so that the IT domain code development platform can control the OT domain process, that is, the fusion of the IT domain and the OT domain is realized. The micro-service is automatically generated by the OT domain micro-service generator on the basis of the OT domain behavior tree, the IT domain code development tool does not need to understand the details of the OT domain workflow, only the identifier (such as name) and the IP address of the micro-service need to be obtained, and the developers of the IT domain do not need to know OT domain device and control process, and therefore, implementation and understanding are easy.

The fields to which the embodiments of the present application are applicable include but are not limited to: industrial automation, logistics, laboratory, maritime, smart grid, electric vehicle infrastructure, electric vehicle, building automation, smart city, water treatment, garbage recycling, smart farm, and the like.

The workflow creation methods incorporating teachings of the present disclosure are described in detail above, and a workflow creation system will be described in detail below. The workflow creation system can be used to implement one or more of the workflow creation methods described herein. For details not disclosed in detail in the system embodiments, please refer to the corresponding description in the method embodiments, which will not be repeated here.

Figure 3:
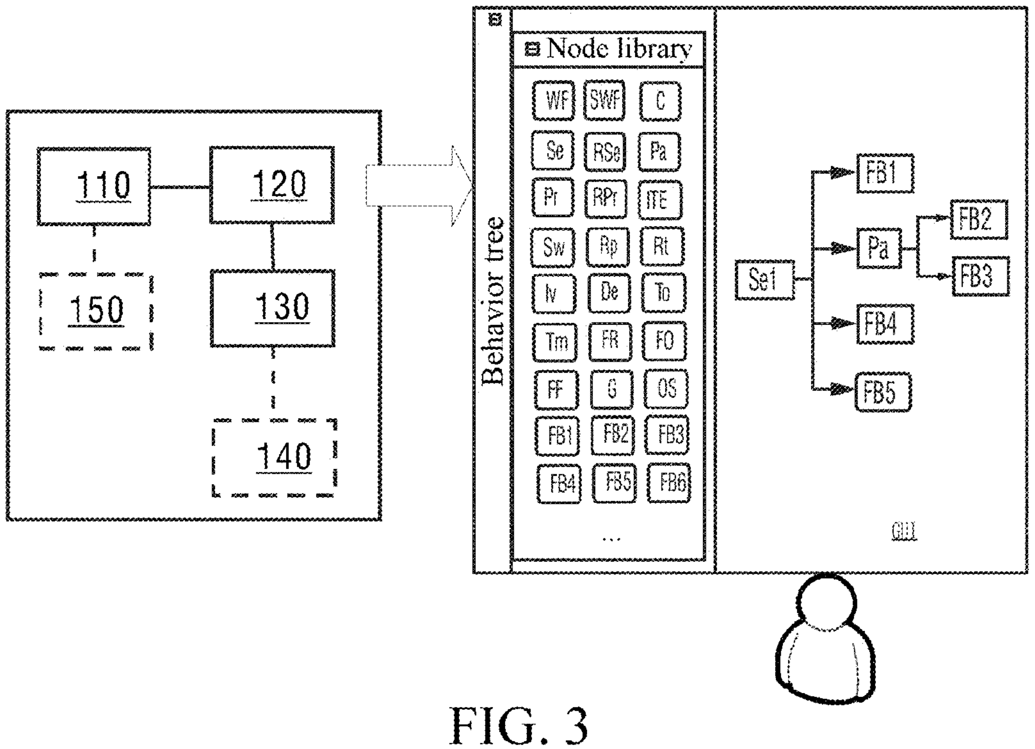
FIG. 3 is a structure diagram of an example workflow creation system incorporating teachings of the present disclosure.

FIG. 3 is a schematic structure diagram of an example workflow creation system incorporating teachings of the present disclosure. As shown in FIG. 3, the system can include: a node library 110, a graphical interface module 120 and an editing processing module 130.

Behavior tree nodes for constructing behavior trees are arranged in the node library 110; and the behavior tree nodes can include: flow control nodes and function block nodes. One behavior tree represents one workflow, and the workflow defines an operation to be executed by one work cell. The flow control nodes are configured to implement logic control over the workflow; the function block nodes are configured to implement a service operation in the workflow, and the function block nodes can include: logic nodes, each logic node corresponding to one operation template, each operation template pre-defining at least one type of resources such as operation executable by a device, and the operation can include: an action, a method or a skill.

In some embodiments, the resources are represented in a form of resource nodes, and all the resource nodes are stored in an associated manner in a form of a resource knowledge graph; The resource knowledge graph includes: each resource node, and a connecting line representing the relationship between the resource nodes. Correspondingly, in this embodiment, the system can further include: a resource library 150 configured to store each resource in the form of the resource knowledge graph, and each resource can execute at least one service operation.

In some embodiments, the flow control nodes can include: part or all of main control nodes, logic control nodes and a condition nodes; the main control nodes can include: part or all of a start node, an end node, a goto node, an anchor node, a stop node, and an abort node. The logic control nodes include: part or all of an Se node, an RSe node, a Pa node, an IPQ node, a Pr node, an RPr node, an ITE node, and an Sw node.

In some embodiments, the function block nodes can further include: part or all of a manual node, a dynamic node, a delay node and an empty (idle) node.

In some embodiments, the behavior tree nodes further include: decorator nodes which can include: part or all of an Rp node, an Rt node, an OS node, a TO node, a Tm node, an Iv node, an FR node, an FO node, an FF node and a G node.

In some embodiments, part or all of the function block nodes in the node library 110 are respectively bound with resources for executing service operations corresponding to the function block nodes.

The graphical interface module 120 is configured to provide a graphical user interface (GUI) for a user to construct a behavior tree on the basis of the behavior tree nodes in the node library. Each behavior tree node can be listed on the graphical user interface (GUI) in a form of an icon.

The editing processing module 130 is configured to: in response to the behavior tree construction operation, generate the behavior tree corresponding to the workflow, the logic nodes in the behavior tree being instantiated into operations of the corresponding device. During implementation, the editing processing module 130 can be configured to: in response to the behavior tree construction operation, instantiate each behavior tree node, and establish a connection relationship between the instantiated behavior tree nodes; and generate the behavior tree corresponding to a workflow on the basis of the connection relationship between the instantiated behavior tree nodes. Part or all of the instantiated function block nodes are associated with resources for executing corresponding service operations. For example, through the operation, the logic node is instantiated into an operation corresponding to the resource such as the device.

Each behavior tree node can be listed on the graphical user interface in a form of an icon, and the user can determine the node required to create the workflow by selecting, dragging the icon to the canvas, and further, the node can be subjected to necessary parameter configuration, such as resource configuration and/or input/output parameter configuration. If an operation to be performed by the work cell, that is, the operation defined in the required workflow is more than one, the behavior tree corresponding to the workflow can include multiple logic nodes, the corresponding flow control nodes can be set according to the sequence and correlation of the operations, and the behavior tree corresponding to the workflow can be finally generated by performing corresponding arrangement and connection on the dragged nodes.

In some embodiments, the construction operation can include: the operation of adding a function block node and the operation of associating resources for the added function block node. Corresponding to the method shown in FIG. 1A, the workflow creation system in this embodiment can further include: an analysis deployment module 140 configured to analyze the behavior tree and deploy the workflow corresponding to the behavior tree to runtime of the corresponding work cell, so that each resource in the work cell executes the operation according to the workflow.

Figure 4A:
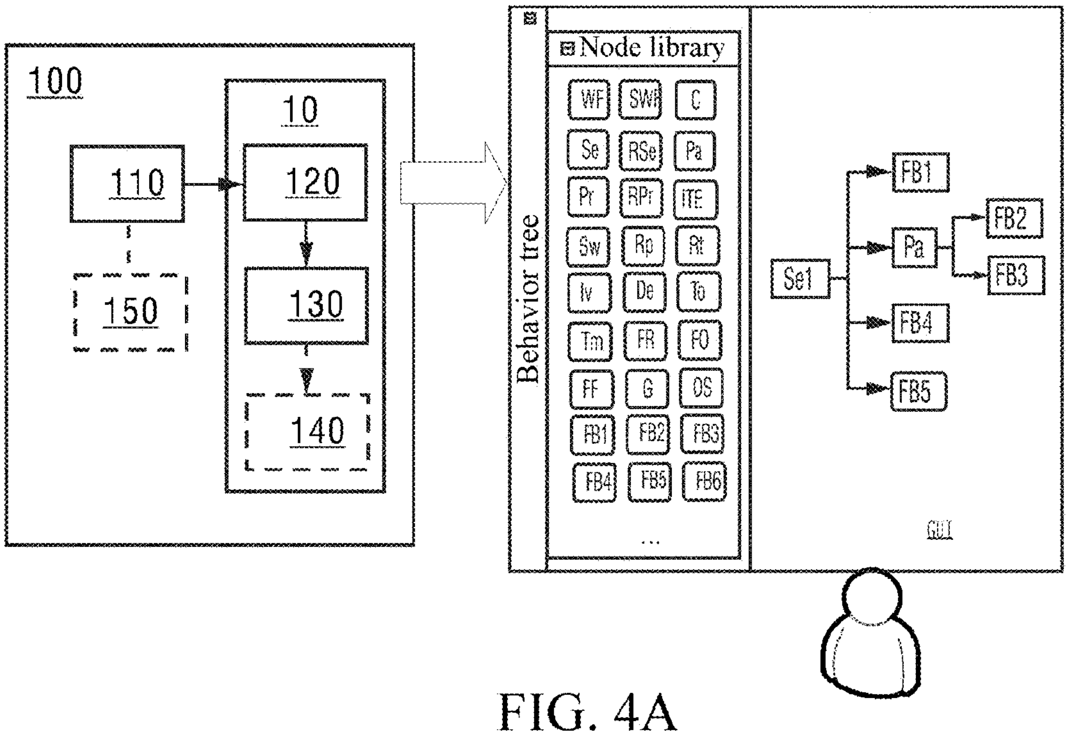
FIG. 4A to FIG. 4D are schematic diagrams of an example workflow creation system incorporating teachings of the present disclosure.

FIG. 4A shows an OT domain low-code development platform 100 incorporating teachings of the present application, and the platform 100 can be configured to implement a workflow creation system shown in FIG. 3. As described above, there is no low-code development tool and platform applied to the OT domain at present. In the platform 100 shown in FIG. 4A, because the operation templates that various OT devices can perform operations are defined in advance (which can be regarded as providing the capabilities of the OT domain), and the corresponding logical nodes are constructed on the basis of the operation templates, and other behavior tree nodes for constructing the OT domain workflow are set, the behavior tree corresponding to the OT domain workflow can be created conveniently and quickly, and low-code development applied to the OT domain is realized. Development engineers can realize the development of OT domain without having a deep understanding of various OT devices.

In some embodiments, as shown in FIG. 4A, the OT domain low-code development platform 100 can include an OT domain low-code development tool 10. The OT domain low-code development tool 10 can be configured to implement the graphical interface module 120 and the editing processing module 130 in the workflow creation system as shown in FIG. 3, and further can implement the analysis deployment module 140 in the workflow creation system as shown in FIG. 3. The node library 110 in the workflow creation system as shown in FIG. 3 can be stored on a memory.

Figure 4B:
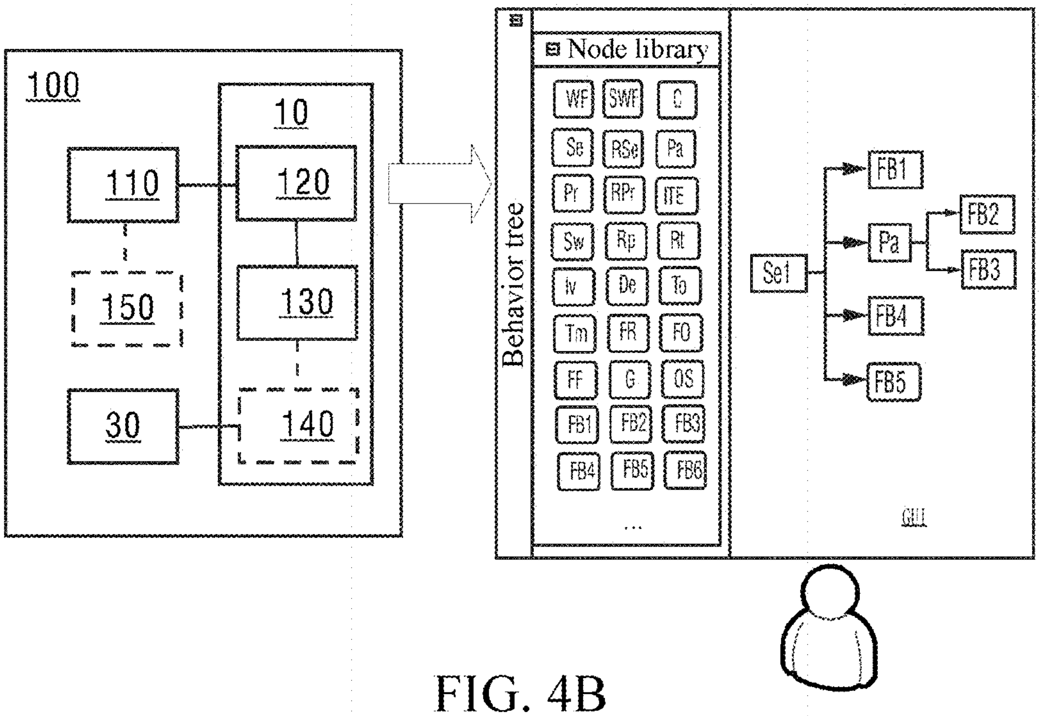

Further, as shown in FIG. 4B, the OT domain low-code development platform 100 can also include a runtime 30 of the main controller of the work cell. The OT domain low-code development tool 10 can deploy the OT domain workflow corresponding to the generated behavior tree to the runtime 30 of the main controller of the work cell, so that each OT device in the work cell connected to the main controller executes operation according to the OT domain workflow.

The synthesis of the OT domain low-code development platform 100 shown in FIG. 4A and FIG. 4B only relates to the OT domain. However, the fusion of the IT domain and the OT domain is more and more important for enterprise digital transformation. How an enterprise adopts an understandable and non-IT programming mode to control the process of the OT domain needs to be realized. The OT domain low-code development platform 100 shown in FIG. 4C solves the problem of how to control the process of the OT domain through the IT domain code development platform 300.

Figure 4C:
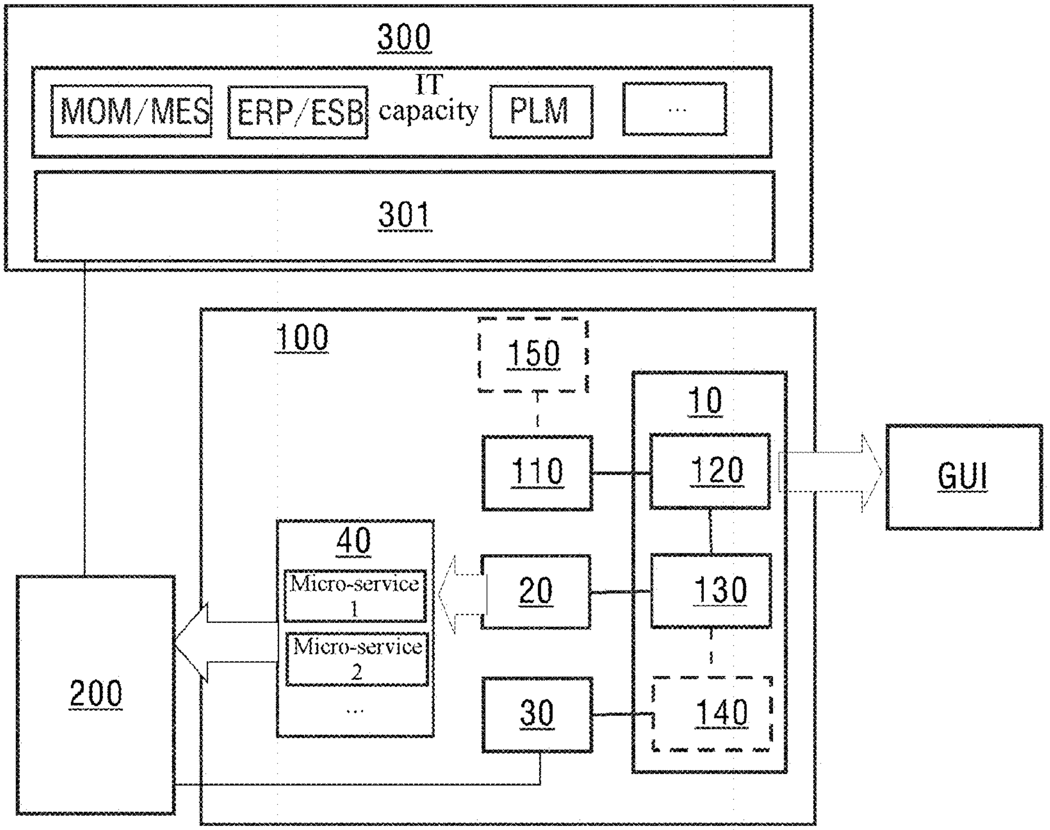

As shown in FIG. 4C, the OT domain low-code development platform 100 can further include an OT domain micro-service generator 20 on the basis of the structure shown in FIG. 4B, and it can generate a micro-service 40 on the basis of the OT domain behavior tree. Therefore, the IT domain code development tool 301 can perform programming to realize that the IT device executes the OT domain workflow when calling the micro-service 40 through the knowledge middle platform 200 to trigger the runtime 30 of a main controller of the work cell. The IT domain code development platform 300 can control the OT domain process, that is, the fusion of the IT domain and the OT domain is realized. The micro-service 40 is automatically generated by the OT domain micro-service generator 20 on the basis of the OT domain behavior tree, the IT domain code development tool 301 does not need to understand the details of the OT domain workflow, only the identifier (such as name) and the IP address of the micro-service 40 need to be obtained, and the developers of the IT domain do not need to know OT domain device and control process, and therefore, implementation and understanding are easy.

If the IT domain needs to call the micro-service 40, the IT domain needs to acquire the information of the micro-service 40.

Corresponding to the method shown in FIG. 1A, the implementation modes include but are not limited to the following two modes:

Mode I:

In the Mode I, a code developer of the OT domain can notify the code developer of the IT domain of the generated name and IP address of each generated micro-service 40, so that the code developer of the IT domain can directly write the information of each micro-service 40 into the code in the development process, thereby realizing the calling of the IT device to the micro-service 40. The Mode I is relatively suitable for scenarios with a small number of micro-services.

Figure 4D:
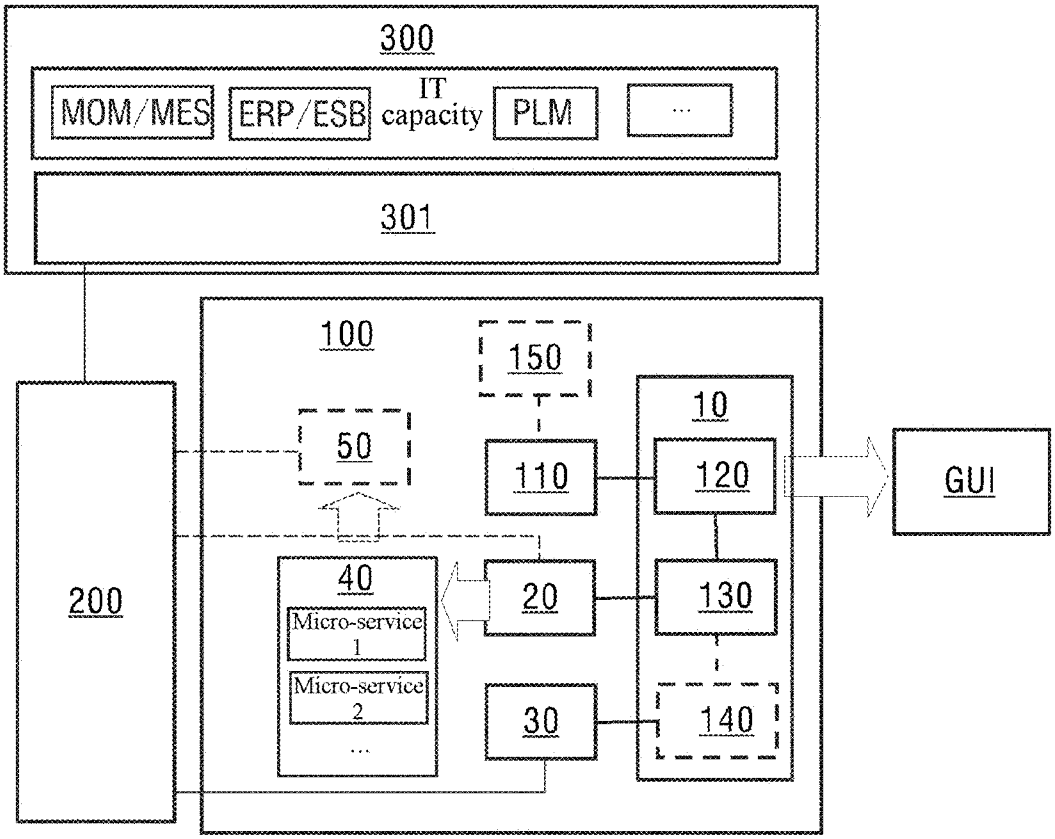

Mode II:

In the Mode II, a registration and discovery mechanism can be adopted. Each micro-service 40 can be registered on the knowledge middle platform 200, so that an IT domain code development tool 301 enables the IT domain device to discover the connected micro-service 40 through the knowledge middle platform 200 by code development. An apparatus which completes the micro-service 40 registration can be an OT domain micro-service generator 20 or a third-party apparatus 50 as shown in FIG. 4D. The third-party apparatus 50 can be regarded as a part of the OT domain low-code development platform 100, or is implemented in the knowledge middle platform 200. The Mode II is relatively suitable for scenarios with a large number of micro-services. By registering the micro-service on the knowledge middle platform, the calling of the IT device to the micro-service is more effectively realized, and the fusion of the OT domain and the IT domain is enhanced.

In some embodiments, the OT domain micro-service generator 20 can generate an API of the micro-service 40 on the basis of the OT domain behavior tree, the processing process in the API can include the operation of each function block in the OT domain workflow, the input parameters of the API are parameters acquired by an input port of the OT domain workflow, and the output parameters of the API are parameters outputted by an output port of the OT domain workflow.

Figure 4E:
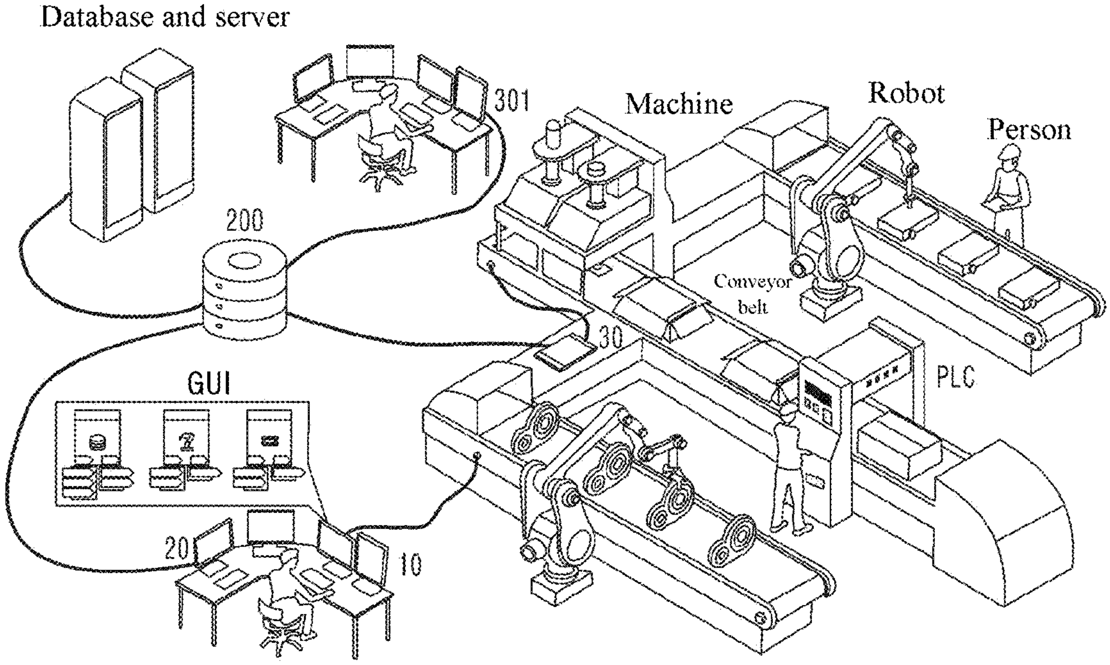
FIG. 4E is an application scenario diagram of an OT domain low-code development platform in the field of industrial automation incorporating teachings of the present disclosure.

An application scenario of the OT domain low-code development platform 100 provided by the embodiments of the present application in the field of industrial automation is shown as FIG. 4E. The low-code development tool 10 generates the behavior tree corresponding to the OT domain workflow under the operation of the user, and the OT domain workflow defines the operation to be executed by a production line serving as a work cell shown on the right of the FIG. 4E.

The corresponding workflow is generated on the basis of the behavior tree and published to the runtime 30, so that the production line operation of the work cell is controlled and completed through the runtime 30. Moreover, the micro-service generator 20 generates a corresponding micro-service on the basis of the behavior tree and registers the micro-service to the knowledge middle platform 200, so that the IT domain code development tool 301 can call the corresponding micro-service through the knowledge middle platform 200. The user can edit the OT domain behavior tree by dragging and editing each node including the function block nodes as shown in the GUI at the lower left of FIG. 4E, for example, required data (such as workpiece processing parameters) are acquired from the database & server through the knowledge middle platform 200 first, and operation of the whole work cell is controlled. The work cell is a production line, and the production line includes a machine, a conveyor belt, a robot, a person, a PLC, an AGB and the like. During implementation, the IT domain code development tool 301 and the low-code development tool 10 can also be located on the same hardware device, such as the same computer.

Figure 5:
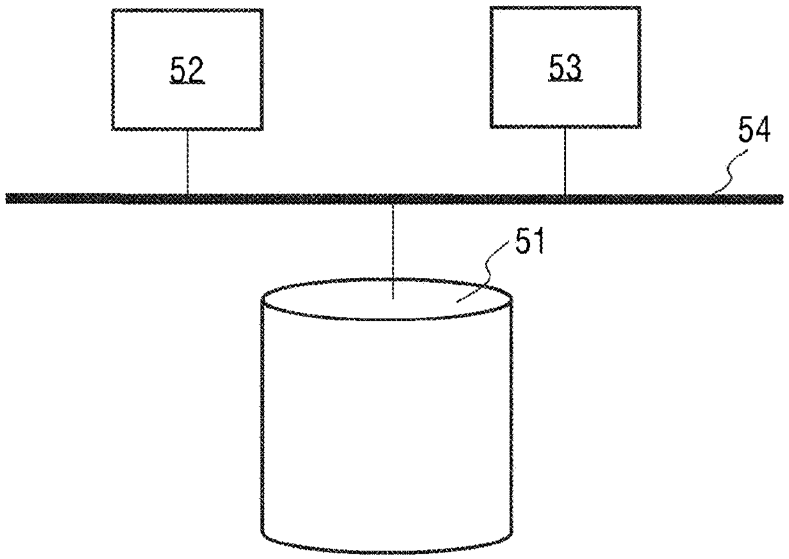
FIG. 5 is a schematic diagram of hardware implementation of an example workflow creation system incorporating teachings of the present disclosure.

FIG. 5 is a schematic structure diagram of another example workflow creation system incorporating teachings of the present disclosure. As shown in FIG. 5, the system can be used for implementing the method shown in FIG. 1A or implementing the workflow creation system shown in FIG. 3, or implementing any workflow creation system in FIG. 4A to FIG. 4D, namely the OT domain low-code development platform 100. The OT domain low-code development tool 10, the OT domain micro-service generator 20, the runtime 30 and the third-party apparatus 60 can be realized as separate hardware devices, such as server, a workstation, a a single-chip microcomputer or a processing chip. In some embodiments, these apparatuses are implemented on the same hardware device and are stored in at least one memory as software programs, and the OT domain low-code development method is implemented through calling of at least one processor. The node library 110 and the generated micro-services 40 can be stored in at least one memory.

As shown in FIG. 5, the system can include: at least one memory 51, at least one processor 52, and at least one display 53. In addition, some other components can be included, such as a communication port (not shown in FIG. 5) and the like. These components communicate through a bus 54.

The at least one memory 51 stores a computer program. The at least one memory 51 can include a computer-readable medium, such as a Random Access Memory (RAM). In addition, the at least one memory 51 can also store an operating system and the like. The operating system includes but is not limited to: an Android operating system, a Symbian operating system, a Windows operating system, a Linux operating system and the like. The computer-storage program can include the following program modules: the node library 110, the graphical interface module 120, the editing processing module 130 and the analysis deployment module 140, and optionally can also include the OT micro-service generator 20, the runtime 30 and the third-party apparatus 50.

At least one processor 52 is configured to call the computer program stored in the at least one memory 51 to execute the workflow creation method described in the embodiment of the present application. The at least one processor 52 can be a microprocessor, an application specific integrated circuit (ASIC), a digital signal processor (DSP), a central processing unit (CPU), a graphics processing unit (GPU), a state machine and the like. The at least one processor can receive and send data through the communication port.

The at least one display 53 is configured to display the image/graphic user interface.

In some embodiments, the at least one processor 52 is configured to call the computer program stored in at least one memory 51 to enable the system to execute one or more of the workflow creation methods described herein. In addition, the communication interface is configured to realize communication with other devices, such as communication with the knowledge middle platform 200.

In some embodiments, the OT domain low-code development tool 10 is configured to implement the graphical interface module 120, the editing processing module 130 and the analysis deployment module 140 can be a lightweight web-based application, can be implemented on an industrial field (such as an edge device or a local server), and can also be implemented on a cloud (such as public cloud of AWS or private cloud of OpenStack). The visual engineering paradigm is derived from a function block typed diagram (FBTD). The OT domain micro-service generator 20 can generate a standard API such as RESTful or RPC by a modern translation programming language. The OT domain workflow can be simply implemented during operation 30, and the openness is provided on the basis of an open source community (such as Python) based ecological system. The runtime 30 can be deployed on an embedded IoT device such as a single board computer (SBC).

The embodiments of the present disclosure can include an apparatus with an architecture different from that shown in FIG. 5. The architecture is only exemplary and is used for describing the workflow construction methods. In addition, some embodiments include an IT domain and OT domain fusion system, namely an ITOT system, which can include an IT device and the workflow creation systems described herein. In addition, the system can further include: an IT domain code development platform 300 as shown in FIG. 4C and FIG. 4D.

Figure 6:
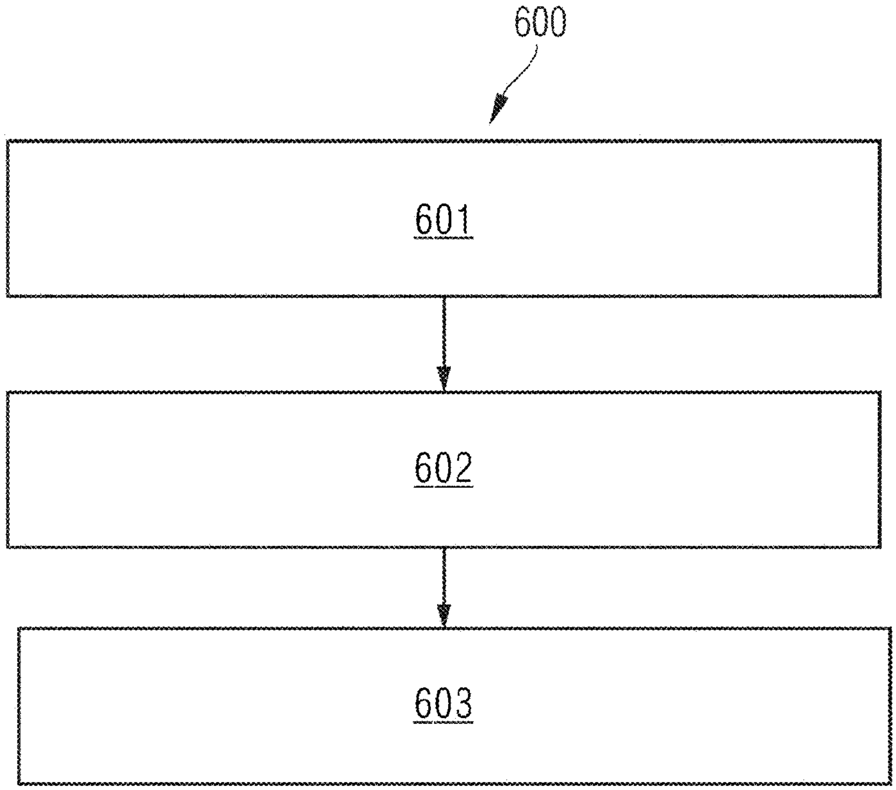
FIG. 6 is a flowchart of an example workflow control method incorporating teachings of the present disclosure.

Some embodiments include a technical solution for controlling the workflow by the compositor node of a low-code paradigm with function block typed diagram logic (FBTD). FIG. 6 is a flowchart of an example workflow control method incorporating teachings of the present disclosure. As shown in FIG. 6, the method 600 includes:

step 601: determining a type of a compositor node on the basis of an operation performed on a graphical user interface by a user, where the compositor node includes a start block suitable for starting execution of the compositor node, an end block suitable for ending execution of the compositor node, and multiple working links arranged between the start block and the end block;

step 602: determining a target working link from the multiple working links on the basis of the type of the compositor node; and step 603: controlling logic of a workflow on the basis of the target working link, where the workflow is generated on the basis of a behavior tree including the compositor node.

The compositor node always appears in pairs with the start block and the end block. The start block has an optional input port to provide a compositor expression, so that the target working link can be selected according to the compositor expression. For example, the target working link is selected according to the value of the compositor expression, or the target working link is selected on the basis of a working link selection rule defined by the compositor expression. The end block has an optional input port called an end logic value, and the compositor node of a parallel type uses the end logic value to determine whether it is an AND or an OR. A set of compositor pair blocks may include two or more working links (i.e., branches). Optionally, before a data value block (DVB) is attached to each working link of the compositor pair blocks, it represents a trigger value of the compositor expression of the corresponding working link. In one embodiment, the data value block may be a value generated for the corresponding working link on the basis of the compositor expression for selecting the corresponding working link. In another embodiment, the data value block may also be a condition for selecting the corresponding working link, and the condition is related to the value generated on the basis of the compositor expression.

In some embodiments, at least one working link of the multiple working links include a function block node, and the function block node is configured to implement a service operation in the workflow.

In some embodiments, the determining a type of a compositor node on the basis of an operation performed on a graphical user interface by a user includes: determining the type of the compositor node on the basis of a selection operation performed on the graphical user interface including a node library by the user, the node library including: a compositor node for identifying the type in a semantic manner or a compositor node for identifying the type in a presentation manner.

In the compositor node for identifying the type in the semantic manner, the type of the compositor node is directly identified in a text mode in an icon, with a visual effect, of the compositor node.

In the compositor node for identifying the type in the presentation manner, the type of the compositor node is correspondingly identified by different presentation modes, for example, in the icon of the compositor node, the type of the compositor node is correspondingly identified by different line types (such as solid lines, dotted lines and interval lines) forming the icon.

In some embodiments, the method further includes: receiving a behavior tree construction operation performed on the graphical user interface by the user, where the construction operation includes an addition and connection operation of a behavior tree node, and the behavior tree node includes the compositor node and the function block node; the behavior tree is used for representing the workflow, and the workflow is used for defining an operation to be executed by a work cell; and the function block node includes: logic nodes, each logic node corresponding to an operation template, each operation template pre-defining at least one type of operation executable by a device, and the operation including: an action, a method or a skill; in response to the behavior tree construction operation, generating the behavior tree corresponding to the workflow, the logic nodes in the behavior tree being instantiated into operations of the corresponding devices; analyzing the behavior tree to acquire the workflow; and deploying the workflow to runtime of the corresponding work cell, so that each device in the work cell executes the operation according to the workflow, where the workflow is an OT domain workflow, and the device is an OT device.

In some embodiments, the method further includes: generating a micro-service on the basis of the behavior tree, so that an IT device executes the OT domain workflow when calling the micro-service to trigger runtime of a main controller of the work cell. Below is an exemplary explanation of using different types of compositor nodes to implement flexible control over the workflows.

Figure 7A:
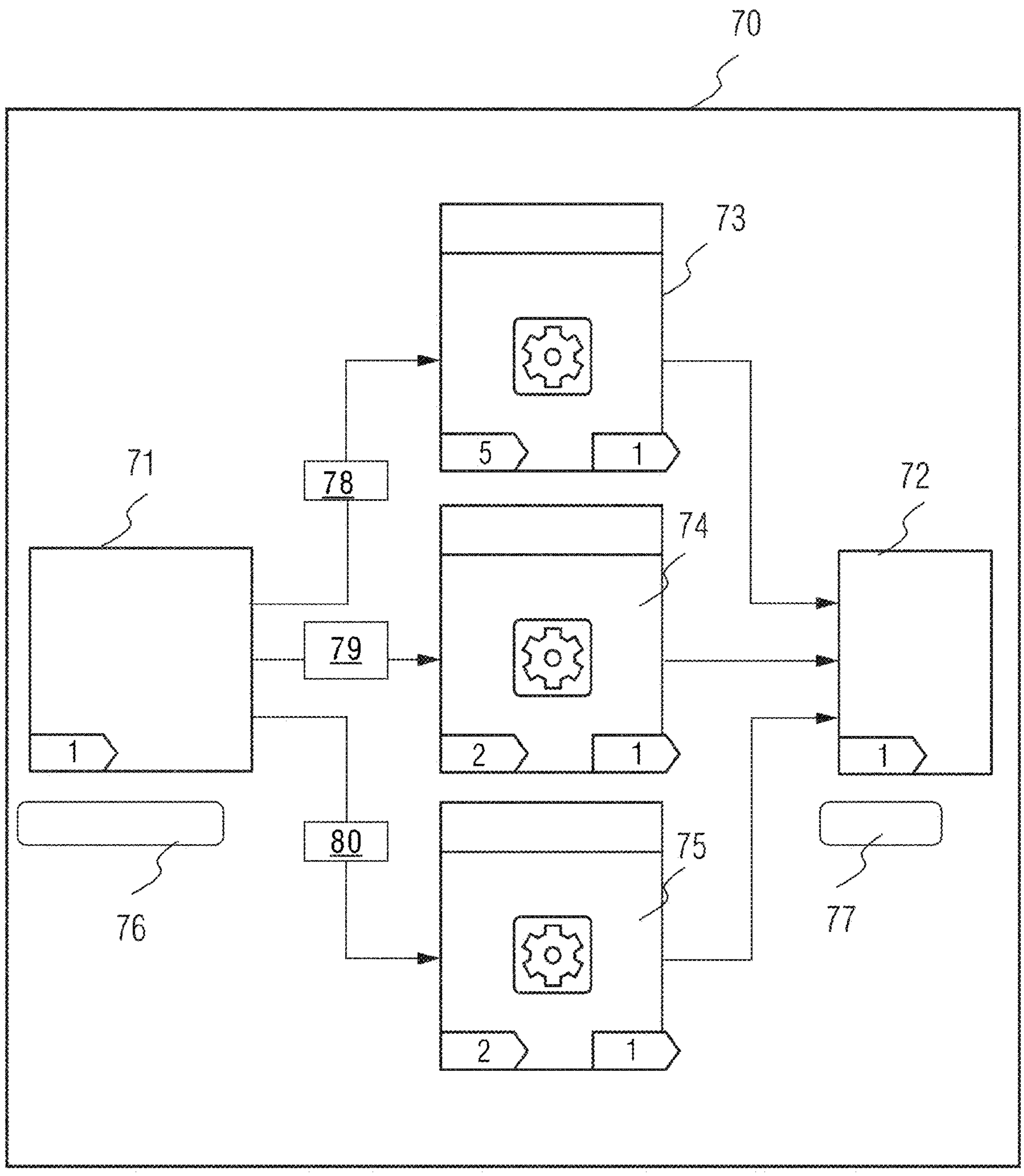
FIG. 7A is a first schematic diagram of a low-code paradigm of an FBTD logic compositor incorporating teachings of the present disclosure.

FIG. 7A is a first schematic diagram of a low-code paradigm of an FBTD logic compositor provided by embodiments of the present application. In FIG. 7A, a compositor node 70 includes a start block 71, an end block 72 and 3 working links arranged between the start block 71 and the end block 72. The first working link includes an execution function block node 73, the second working link includes an execution function block node 74, and the third working link includes an execution function block node 75. The start block 71 can include an input end used for providing a composition expression 76; and the end block 72 can include an input end used for providing an end logic value 77. Each function block node 73, function block node 74 and function block node 75 respectively have a respective data value block. A data value block 78 of the function block node 73, a data value block 79 of the function block node 74 and a data value block 80 of the function block node 75 can be arranged in front of the respective corresponding function block node.

Different modes of determining the target working link from the multiple working links can be implemented depending on different types of the compositor node 70, and therefore flexible control over the workflow is implemented.

In some embodiments, the type of the compositor node 70 is parallel selection (Pa, Parallel); the determining a target working link from the multiple working links includes: determining each working link of the multiple working links as the target working link, and starting to execute the target working link; and the method further includes: receiving an end logic value through the input end of an end block, where when the end logic value is a logic AND, and the multiple working links are executed completely, ending execution of the compositor node through the end block; and when the end logic value is a logic OR, and at least one working link of the multiple working links is executed, ending execution of the compositor node through the end block.

In FIG. 7A, when the type of the compositor node 70 is Pa, a composition expression 76 does not need to be provided for the compositor node 70, correspondingly, synthesis data value blocks 78-80 do not need to be generated, and an end logic value 77 needs to be provided for the compositor node 70. In this case, the first working link, the second working link and the third working link are determined as the target working links. Moreover, the first working link, the second working link and the third working link are respectively executed (namely the function block node 73, the function block node 74 and the function block node 75 are synchronously executed), and when the compositor node 70 is stopped to be executed is determined on the basis of the end logic value 77. When the value of the provided end logic value 77 is a logic AND, and the first working link, the second working link and the third working link are executed, the execution of the compositor node 70 is ended through the end block 72; and when the value of the end logic value 77 is a logic OR, and at least one working link of the first working link, the second working link and the third working link is executed, the execution of the compositor node 70 is ended through the end block 72.

In some embodiments, the type of the compositor node is SW (Switch), and the method further includes: receiving a preset composition expression through an input end of the start block; and the determining a target working link from the multiple working links includes: determining a data value block when each working link is selected; and selecting a target working link conforming to the corresponding data value block from the multiple working links on the basis of a computation result of the composition expression.

In FIG. 7A, when the type of the compositor node 70 is SW, a composition expression 76 needs to be provided, synthesis data value blocks 78-80 correspondingly need to be generated or manually provided on the basis of the composition expression 76, but the end logic value 77 does not need to be provided. For example, assuming that the data value block is a condition for selecting the corresponding working link, the data value block 78 is that: "the temperature is greater than 30° C. and less than 50° C."; the data value block 79 is that: "the temperature is greater than 50° C."; and the data value block 80 is that: "the temperature is less than 30° C.". Therefore, a specific branch corresponding to the value block can be selected on the basis of the specific temperature generated by the composition expression. For example, when the generated temperature is 20° C., the third working link corresponding to the data value block 80 is selected.

In some embodiments, the type of the compositor node is ITE (If-Then-Else), and the method further includes: receiving a preset composition expression through an input end of the start block, a result of the composition expression including a logic true value or a logic false value; and the determining a target working link from the multiple working links includes: determining a corresponding target working link from the multiple working links on the basis of the result of the composition expression being the logic true value or the logic false value.

The preset working link corresponding to the logic value is selected on the basis of that the logic value generated by the composition expression is true or false. In FIG. 7A, when the type of the compositor node 70 is ITE, the composition expression 76 that can generate the logical value as true or false needs to be provided, and it is assumed that the first working link corresponds to true and a second working link corresponds to false. When the value of the composition expression 76 is true, the first working link serving as the target working link is selected and executed; and when the value of the composition expression 76 is false, the second working link serving as the target working link is selected and executed.

In some embodiments, the type of the compositor node is Pr (Priority (Fallback)), and the method further includes: receiving a preset composition expression through an input end of the start block; and the determining a target working link from the multiple working links includes: computing a data value block of each working link on the basis of the composition expression; determining a priority rank of the multiple working links on the basis of a ranking result of the data value block of each working link; and determining the target working link from the multiple working links on the basis of the priority rank. The data value block can be a value which is generated by the corresponding working link on the basis of the compositor expression and configured to select the corresponding working link. That is, the data value block 78, the data value block 79 and the data value block 80 generated on the basis of the compositor expression may be different (for example, the parameter difference of all execution links), and in this case, the priority rank of the working links is determined on the basis of the sorting result of the data value block of each working link; and the target working link is determined from the multiple working links on the basis of the priority rank, and the sorting result of the data value blocks can be sorted from large to small or from small to large on the basis of presetting.

For example, in FIG. 7A, when the type of the compositor node 70 is Pr, the composition expression 76 needs to be provided. It is assumed that the data value block generated by the first link on the basis of the composition expression 76 is 15; and it is assumed that the data value block 78 generated by the first link on the basis of the composition expression 76 is 18, the data value block 79 generated by the second link on the basis of the composition expression 76 is 20, and the data value block 80 generated by the third link on the basis of the composition expression 76 is 25. The priority rank of the working links is determined according to the size of the data value blocks, it is clear that the third link has the maximum priority (because the data value block 80 of the third link has the maximum data value), and therefore, the third link is determined as the target working link and executed as the target working link.

In some embodiments, the type of the compositor node is RPr (Reactive Priority (Fallback)), and the method further includes: receiving a first composition expression and a second composition expression through an input end of the start block; and the determining a target working link from the multiple working links includes: computing a first data value block of each working link on the basis of the first composition expression; computing a second data value block of each working link on the basis of the second composition expression; determining a priority rank of the multiple working links on the basis of a ranking result of the first data value blocks of the multiple working links; and determining the target working link from the multiple working links on the basis of the priority rank and the second data value block of each working link.

Figure 7B:
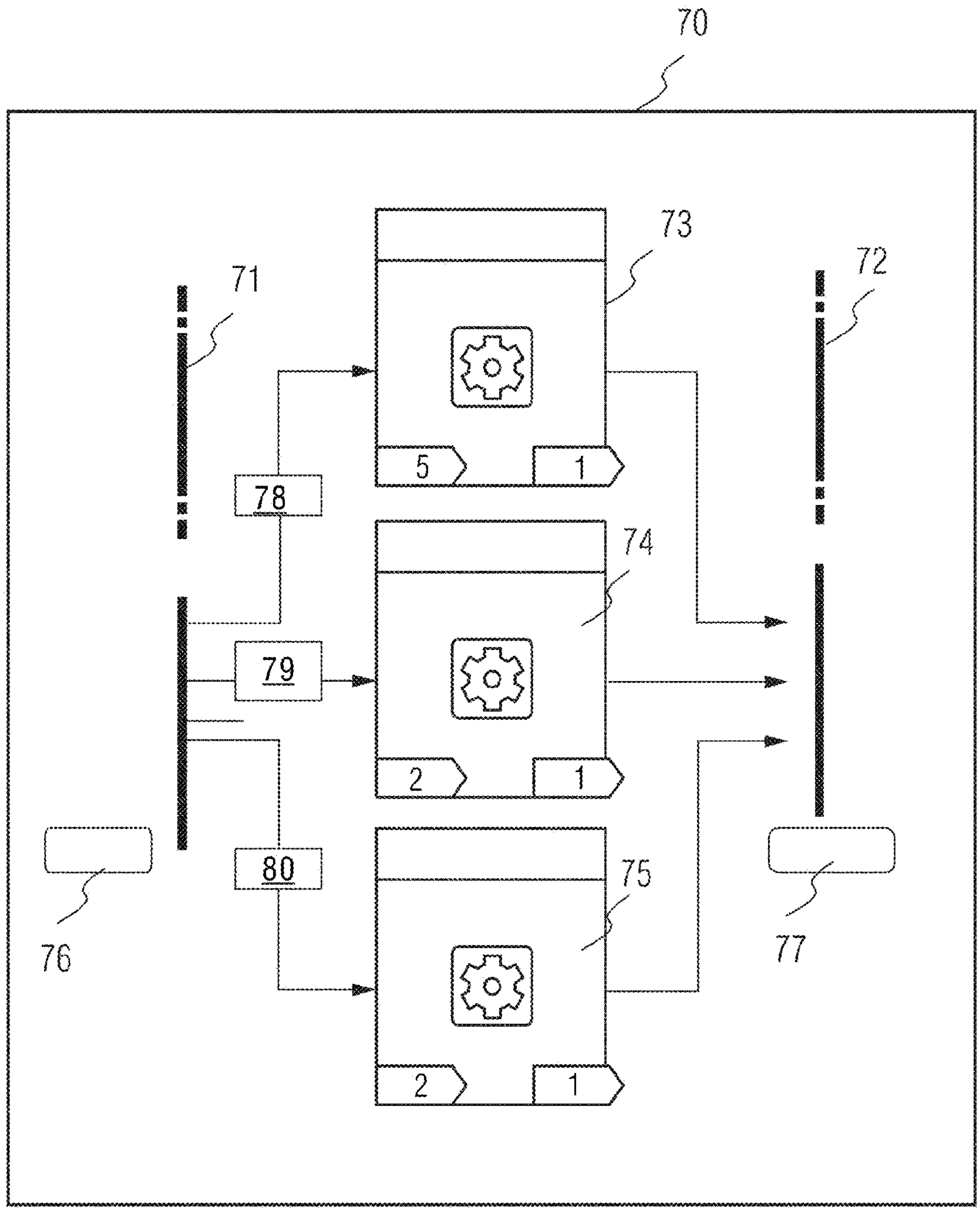
FIG. 7B is a second schematic diagram of a low-code paradigm of an FBTD logic compositor incorporating teachings of the present disclosure.

In FIG. 7A, in the icon, with the visual effect, of the compositor node, the type of the compositor node can be directly identified in a text mode (for example, the type is identified in a text mode in a square frame of the start block 71 and the end block 72). FIG. 7B is a second schematic diagram of a low-code paradigm of an FBTD logic compositor provided by k embodiments of the present application. In FIG. 7B, the start block 71 and the end block 72 are briefly identified by the interval line with the specific shape, so that the type of the compositor node can be visually identified, and the display resources of the canvas can be saved.

The compositor node is easy to understand but is only applied to a limited number of branches. Therefore, a new compositor node paradigm is introduced in the embodiment of the present application, which can support a large number of branches. The folding compositor has the function similar to that of a common compositor, but supports folding.

In some embodiments, the compositor node is displayed in a folding mode in a folding frame on the graphical user interface, and the folding frame includes a first display area which is suitable for displaying a currently displayed working link of the compositor node and hiding working links except the currently displayed working link. In some embodiments, the folding frame further includes a second display area, a third display area and a switch control; the second display area is suitable for displaying a data value block of the currently displayed working link; the third display area is suitable for displaying a label of the currently displayed working link; and the switch control is suitable for switching the currently displayed working link among the multiple working links.

Figure 7C:
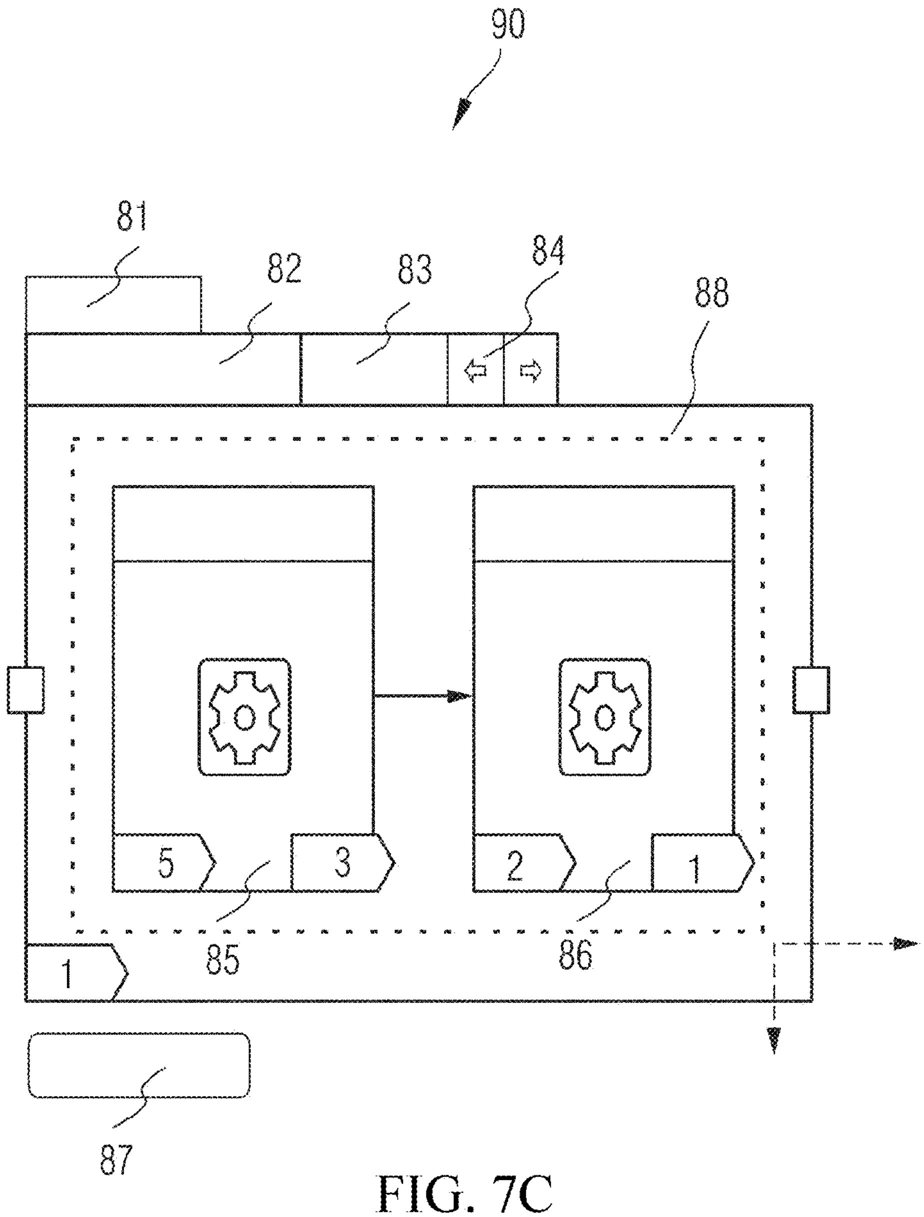
FIG. 7C is a schematic diagram of a low-code paradigm of an FBTD logic compositor having a folded form incorporating teachings of the present disclosure.

FIG. 7C is a schematic diagram of a low-code paradigm of an FBTD logic compositor having a folded form provided by embodiments of the present application. In FIG. 7C, a folding frame 90 includes a first display area 88, a second display area 83 and a third display area 81, the currently displayed working link is displayed in the first display area 88, and the currently displayed working link includes a function block node 85 and a function block node 86. The data value block of the currently displayed working link is displayed in the second display area 83. The label of the currently displayed working link is displayed in the third display area 81. The folding frame 90 further includes a switch control 84 (such as an arrow shape) configured to switch the currently displayed working link among the multiple working links.

The first display area 88 may be stretchable and can be stretched on the basis of the length of the currently displayed working link contained in the first display area. Therefore, the folding compositor is another type of FBTD compositor low-code paradigm. The data value block of the compositor expression result can be in a new column of the header row. Moreover, a left arrow button and a right arrow button can be switched between different branches. The data value block of the current branch is displayed in the data value block column. Moreover, the current label of the current branch of the compositor is displayed in a work instruction label index block. The size of the folding compositor can be stretched for different numbers of function blocks, and this paradigm provides a convenient mode for displaying complex logic in a limited area of the low-code canvas.

Figure 8:
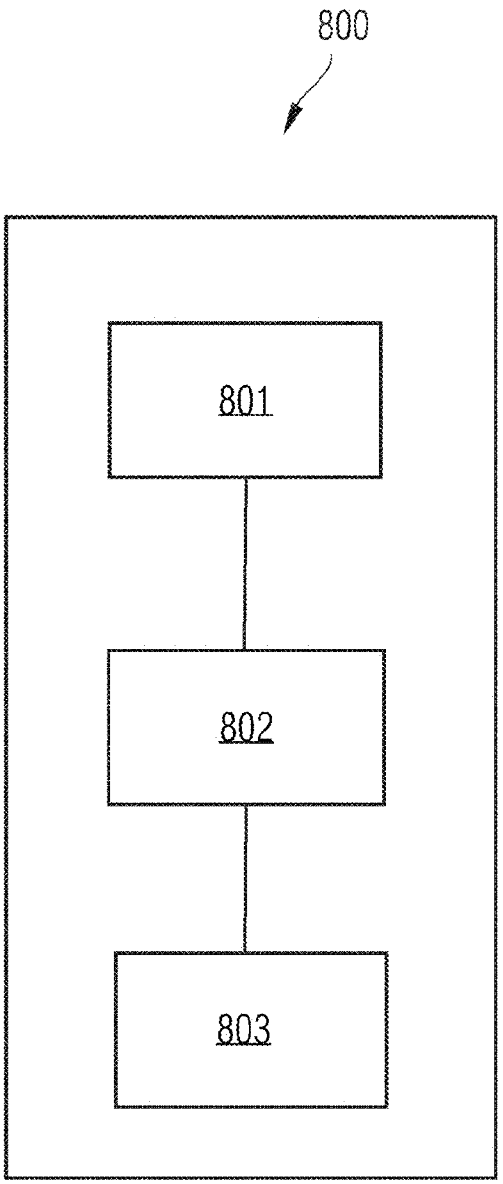
FIG. 8 is a structure diagram of an example workflow control apparatus incorporating teachings of the present disclosure.

FIG. 8 is a structure diagram of an example workflow control apparatus incorporating teachings of the present disclosure. The workflow control apparatus 800 includes: a first determination module 801 configured to determine a type of a compositor node on the basis of an operation performed on a graphical user interface by a user, where the compositor node includes a start block suitable for starting execution of the compositor node, an end block suitable for ending execution of the compositor node, and multiple working links arranged between the start block and the end block; a second determination module 802 configured to determine a target working link from the multiple working links on the basis of the type of the compositor node; and a control module 803 configured to control logic of a workflow on the basis of the target working link, where the workflow is generated on the basis of a behavior tree including the compositor node.

In some embodiments, the first determination module 801 is configured to determine the type of the compositor node on the basis of a selection operation performed on the graphical user interface including a node library by the user, the node library including: a compositor node for identifying the type in a semantic manner or a compositor node for identifying the type in a presentation manner.

In some embodiments, at least one working link of the multiple working links includes a function block node, and the function block node is configured to implement a service operation in the workflow; the first determination module 801 is configured to receive a behavior tree construction operation performed on the graphical user interface by the user, where the construction operation includes an addition and connection operation of a behavior tree node, and the behavior tree node includes the compositor node and the function block node; the behavior tree is used for representing the workflow, and the workflow is used for defining an operation to be executed by a work cell; and the function block node includes: logic nodes, each logic node corresponding to an operation template, each operation template pre-defining at least one type of operation executable by a device, and the operation including: an action, a method or a skill; in response to the behavior tree construction operation, generating the behavior tree corresponding to the workflow, the logic nodes in the behavior tree being instantiated into operations of the corresponding devices; analyzing the behavior tree to acquire the workflow; and deploying the workflow to runtime of the corresponding work cell, so that each device in the work cell executes the operation according to the workflow, where the workflow is an OT domain workflow, and the device is an OT device.

In some embodiments, a computer-readable storage medium stores computer-readable codes thereon, when executed by a processor, the computer-readable codes causing the processor to execute the workflow construction method and the workflow control method above. In some embodiments, a computer program product is stored on a tangible computer-readable medium and including computer-readable instructions, when executed, the computer-readable instructions causing at least one processor to execute the steps in the workflow creation method and the workflow control method in the embodiments of the present application.

In some embodiments, include a workflow creation system which is provided with a system structure similar to that in FIG. 5, and the system can include: at least one memory 51, at least one processor 52, and at least one display 53. The at least one processor 52 is configured to call a computer program stored in the at least one memory 51 and execute one or more of the workflow control methods described herein.

In some embodiments, a system or an apparatus provided with a storage medium can be provided, the computer-readable codes for realizing the functions of any implementation mode of the embodiment are stored on the storage medium, and a computer (or a CPU or an MPU) of the system or the apparatus reads and executes the computer-readable codes stored in the storage medium. In addition, an operating system and the like operated on the computer can complete partial or all actual operations through instructions on the basis of the computer-readable codes. The computer-readable codes read from the storage medium can also be written into a memory arranged in an expansion board inserted into the computer or written into a memory arranged in an expansion unit connected with the computer, and then the CPU and the like arranged on the expansion board or the expansion unit execute partial or all actual operations on the basis of the instructions of the computer-readable codes, thereby realizing the functions of any one of the implementation modes above.

The embodiments of the computer-readable medium includes but is not limited to a floppy disk, a CD-ROM, a magnetic disk, an optical disk (such as a CD-ROM, a CD-R, a CD-RW, a DVD-ROM, a DVD-RAM, a DVD-R, and a DVD+RW), a memory chip, an ROM, an RAM, an ASIC, a configured processor, an all-optical medium, all magnetic tapes or other magnetic media, or any other medium from which the computer processor can read instructions. In addition, various other forms of computer-readable media can transmit or carry instructions to a computer, including a router, a private or public network, or other wired and wireless transmission devices or channels, for example, the computer-readable instructions can be downloaded from a server computer or cloud by a communication network. The instructions can include codes of any computer programming language, including C, C++, C language, Visual Basic, java and JavaScript.

Not all steps and modules in the above processes and system structure diagrams are necessary, and some steps or modules can be ignored according to actual needs. The execution order of each step is not fixed and can be adjusted as needed. The system structure described in the above embodiments can be a physical structure or a logical structure, that is, some modules may be implemented by the same physical entity, or some modules may be implemented by multiple physical entities or may be jointly implemented by certain components in multiple independent devices.

The foregoing descriptions are merely example embodiments of the teachings of the present disclosure but are not intended to limit thereof. Any modification, equivalent replacement, or improvement made within the spirit and principle of the present disclosure shall fall within the protection scope thereof.

What is claimed is:

1. A workflow control method comprising:

determining a type of a compositor node on the basis of an operation performed on a graphical user interface (GUI) by a user, wherein the compositor node comprises a start block to start execution of the compositor node, an end block to end execution of the compositor node, and a plurality of working links arranged between the start block and the end block;

determining a target working link from the plurality of working links based at least in part on the type of the compositor node; and controlling logic of a workflow based on the target working link, wherein the workflow is generated on the basis of a behavior tree comprising the compositor node.

2. The workflow control method according to claim 1, wherein;

at least one working link of the plurality of working links comprises a function block node; and the function block node is configured to implement a service operation in the workflow.

3. The workflow control method according to claim 1, wherein determining a type of a compositor node comprises determining a type of the compositor node on the basis of a selection operation performed on the graphical user interface comprising a node library by the user, the node library comprising: a compositor node for identifying the type in a semantic manner or a compositor node for identifying the type in a presentation manner.

4. The workflow control method according to claim 2, further comprising:

receiving a behavior tree construction operation performed on the GUI by the user, wherein the construction operation comprises an addition and connection operation of a behavior tree node, and the behavior tree node comprises the compositor node and the function block node;

wherein the behavior tree is used for representing the workflow, and the workflow is used for defining an operation to be executed by a work cell; and the function block node comprises: logic nodes, each logic node corresponding to an operation template, each operation template pre-defining at least one type of operation executable by a device, and the operation comprising: an action, a method or a skill;

in response to the behavior tree construction operation, generating the behavior tree corresponding to the workflow, the logic nodes in the behavior tree being instantiated into operations of the corresponding devices;

analyzing the behavior tree to acquire the workflow; and deploying the workflow to runtime of the corresponding work cell, so that each device in the work cell executes the operation according to the workflow;

wherein the workflow is an operational technology (OT) domain workflow, and the device is an OT device.

5. The workflow control method according to claim 4, further comprising generating a micro-service on the basis of the behavior tree, so that an information technologies (IT) device executes the OT domain workflow when calling the micro-service to trigger runtime of a main controller of the work cell.

6. The workflow control method according to claim 1, wherein:

the type of the compositor node is Parallel;

determining a target working link from the plurality of working links comprises determining each working link of the plurality of working links as the target working link; and the method further comprises receiving an end logic value through an input end of the end block;

wherein when the end logic value is a logic AND, and the plurality of working links are executed completely, ending execution of the compositor node through the end block; and when the end logic value is a logic OR, and at least one working link of the plurality of working links is executed completely, ending execution of the compositor node through the end block.

7. The workflow control method according to claim 1, wherein:

the type of the compositor node is Switch; and the method further comprises receiving a preset composition expression through an input end of the start block; and determining a target working link from the plurality of working links comprises determining a data value block when each working link is selected; and selecting a target working link conforming to the corresponding data value block from the plurality of working links on the basis of a computation result of the composition expression.

8. The workflow control method according to claim 1, wherein the type of the compositor node is If-Then-Else, and the method further comprises: receiving a preset composition expression through an input end of the start block, a result of the composition expression comprising a logic true value or a logic false value; and determining a target working link from the plurality of working links comprises:

determining a corresponding target working link from the plurality of working links on the basis of the result of the composition expression being the logic true value or the logic false value.

9. The workflow control method according to claim 1, wherein the type of the compositor node is Priority, and the method further comprises:

receiving a preset composition expression through an input end of the start block; and determining a target working link from the plurality of working links comprises:

computing a data value block of each working link on the basis of the composition expression;

determining a priority rank of the plurality of working links on the basis of a ranking result of the data value block of each working link; and determining the target working link from the plurality of working links on the basis of the priority rank.

10. The workflow control method according to claim 1, wherein the type of the compositor node is Reactive Priority, and the method further comprises receiving a first composition expression and a second composition expression through an input end of the start block; and determining a target working link from the plurality of working links comprises:

computing a first data value block of each working link on the basis of the first composition expression;

computing a second data value block of each working link on the basis of the second composition expression;

determining a priority rank of the plurality of working links on the basis of a ranking result of the first data value blocks of the plurality of working links; and determining the target working link from the plurality of working links on the basis of the priority rank and the second data value block of each working link.

11. The workflow control method according to claim 1, further comprising displaying the compositor node in a folding mode in a folding frame on the graphical user interface;

wherein the folding frame comprises a first display area suitable for displaying a currently displayed working link of the compositor node and hiding working links except the currently displayed working link.

12. The workflow control method-f according to claim 11, wherein:

the folding frame further comprises a second display area, a third display area, and a switch control;

the second display area is suitable for displaying a data value block of the currently displayed working link;

the third display area is suitable for displaying a label of the currently displayed working link; and the switch control is suitable for switching the currently displayed working link among the plurality of working links.

13. A workflow control apparatus comprising:

a first determination module configured to determine a type of a compositor node on the basis of an operation performed on a graphical user interface by a user;

wherein the compositor node comprises a start block suitable for starting execution of the compositor node, an end block suitable for ending execution of the compositor node, and a plurality of working links arranged between the start block and the end block;

a second determination module configured to determine a target working link from the plurality of working links on the basis of the type of the compositor node; and a control module configured to control logic of a workflow on the basis of the target working link, wherein the workflow is generated on the basis of a behavior tree comprising the compositor node.

14. The workflow control apparatus according to claim 13, wherein:

the first determination module is configured to determine the type of the compositor node on the basis of a selection operation performed on the graphical user interface comprising a node library by the user; and the node library comprises: a compositor node for identifying the type in a semantic manner or a compositor node for identifying the type in a presentation manner.

15. The workflow control apparatus according to claim 13, wherein at least one working link of the plurality of working links comprises a function block node, and the function block node is configured to implement a service operation in the workflow;

the first determination module is configured to receive a behavior tree construction operation performed on the graphical user interface by the user, wherein the construction operation comprises an addition and connection operation of a behavior tree node, and the behavior tree node comprises the compositor node and the function block node;

the behavior tree is used for representing the workflow, and the workflow is used for defining an operation to be executed by a work cell; and the function block node comprises: logic nodes, each logic node corresponding to an operation template, each operation template pre-defining at least one type of operation executable by a device, and the operation comprising: an action, a method or a skill;

in response to the behavior tree construction operation, generating the behavior tree corresponding to the workflow, the logic nodes in the behavior tree being instantiated into operations of the corresponding devices;

analyzing the behavior tree to acquire the workflow; and deploying the workflow to runtime of the corresponding work cell, so that each device in the work cell executes the operation according to the workflow, wherein the workflow is an OT domain workflow, and the device is an OT device.

16. A workflow control system comprising:

at least one memory configured to store computer-readable codes; and at least one processor configured to call the computer-readable codes and execute the workflow control method according to claim 1.

* * * * *